United States Patent
Jakobsson et al.

(10) Patent No.: US 10,002,242 B2
(45) Date of Patent: Jun. 19, 2018

(54) ELECTRONIC DEVICE ACCESS CONTROL USING BIOMETRIC TECHNOLOGIES

(71) Applicant: QUALCOMM Incorporated, San Diego, CA (US)

(72) Inventors: Bjorn Markus Jakobsson, Portola Valley, CA (US); Mark Bapst, South Barrington, IL (US); Laurence Geoffrey Lundblade, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 201 days.

(21) Appl. No.: 14/944,605

(22) Filed: Nov. 18, 2015

(65) Prior Publication Data

US 2017/0053108 A1    Feb. 23, 2017

Related U.S. Application Data

(60) Provisional application No. 62/206,049, filed on Aug. 17, 2015.

(51) Int. Cl.
*G06F 21/00* (2013.01)
*G06F 21/32* (2013.01)
(Continued)

(52) U.S. Cl.
CPC .............. *G06F 21/32* (2013.01); *G06F 21/35* (2013.01); *G06F 21/40* (2013.01); *G06F 21/53* (2013.01);
(Continued)

(58) Field of Classification Search
None
See application file for complete search history.

(56) References Cited

U.S. PATENT DOCUMENTS 6,757,411 B2   6/2004 Chau
7,505,613 B2   3/2009 Russo
(Continued)

FOREIGN PATENT DOCUMENTS

EP    1318459 A1   6/2003
WO    9508821 A1   3/1995

OTHER PUBLICATIONS

International Search Report and Written Opinion—PCT/US2016/044821—ISA/EPO—dated Oct. 4, 2016—10 pgs.
(Continued)

*Primary Examiner* — Eleni A Shiferaw
*Assistant Examiner* — Andrew J Steinle
(74) *Attorney, Agent, or Firm* — Hunter Clark PLLC

(57) ABSTRACT

Methods, apparatus, and computer program products for controlling access to an electronic device based on biometric input are described. An example of such a method includes receiving a current biometric input, determining template similarity scores for the current biometric input, if at least one template similarity score satisfies a template similarity score criterion, then updating a false user counter value in a first numerical direction and performing an authentication process on the current biometric input, else, determining stored biometric input similarity scores for the current biometric input, if at least one stored biometric input similarity score satisfies a stored biometric input similarity score criterion, then maintaining the false user counter value, else, replacing a previously stored biometric input with the current biometric input, and updating the false user counter value in a second numerical direction opposite to the first numerical direction.

32 Claims, 9 Drawing Sheets

(51) Int. Cl.
    *H04L 29/06*     (2006.01)
    *G06F 21/56*     (2013.01)
    *G06F 21/35*     (2013.01)
    *G06F 21/40*     (2013.01)
    *G06F 21/53*     (2013.01)

(52) U.S. Cl.
    CPC .............. *G06F 21/56* (2013.01); *H04L 63/08* (2013.01); *H04L 63/0861* (2013.01); *H04L 63/10* (2013.01); *G06F 2221/2101* (2013.01); *G06F 2221/2117* (2013.01); *H04L 63/1483* (2013.01)

(56) References Cited

U.S. PATENT DOCUMENTS

| | | |
|---|---|---|
| 8,242,881 B2 | 8/2012 | Uno et al. |
| 8,468,211 B2 | 6/2013 | Miller |
| 9,043,941 B2 | 5/2015 | Yamada et al. |
| 2004/0181673 A1* | 9/2004 | Lin ..................... G06F 21/6245 713/182 |
| 2006/0098795 A1* | 5/2006 | Choti ..................... H04L 63/10 379/114.14 |
| 2008/0212846 A1* | 9/2008 | Yamamoto ......... G06K 9/00087 382/115 |
| 2013/0198819 A1* | 8/2013 | Gordon ................... G06F 21/31 726/5 |
| 2013/0332365 A1* | 12/2013 | Evans ................... G06Q 20/20 705/44 |

OTHER PUBLICATIONS

Second Written Opinion from International Application No. PCT/US2016/044821, dated Jul. 6, 2017, 6 Pages.

International Preliminary Report on Patentability—PCT/US2016/044821, the International Bureau of WIPO—Geneva, Switzerland, dated Oct. 17, 2017.

* cited by examiner

ELECTRONIC DEVICE ACCESS CONTROL USING BIOMETRIC TECHNOLOGIES

CROSS REFERENCE TO RELATED APPLICATIONS

This application claims the benefit of U.S. Provisional Application No. 62/206,049 filed on Aug. 17, 2015 and entitled "Defending Against Spoofing Attacks Using Biometric Technologies," which is assigned to the assignee hereof and the contents of which are incorporated herein by reference in their entirety.

BACKGROUND

An aspect of this invention generally relates to data processing devices and more particularly to performing biometric authentication within a data processing device.

Data processing devices such as smart phones and personal computing systems often rely on biometric sensors to safeguard data. In general, biometric security systems allow a user to gain access if biometric information submitted by the user is authenticated by the device. A typical authentication process relies on matching the biometric information submitted by the user with a previously established and stored template, which is a data representation of a source biometric sample. Authentication algorithms may include complex computations that require higher levels of processor capabilities to minimize latency issues. The complexity and corresponding power resource requirements may be calibrated to achieve an acceptable False Acceptance Rate (FAR) in view of the limited battery power and processing capabilities on a mobile device. A FAR with a low threshold may allow false or spoofed biometric inputs to attack a trusted biometric system. For example, typical biometric authentication security solutions have a FAR of approximately 1%. This corresponds to a 99% chance that a false, spoofed, or unclear biometric input is identified by the system as not matching the template and a 1% chance that the false, spoofed, or unclear biometric input is identified by the system as matching the template. The unclear biometric input may correspond to a biometric input from the authorized user that is incomplete and/or distorted. For example, a fingerprint from a dirty finger of the authorized user or a scratch on the fingerprint input device may cause the biometric authentication system to identify the fingerprint of the authorized user as an unauthenticated fingerprint. As a number of false inputs supplied to the biometric authentication system increases the probability of gaining unauthorized access to the device also increases. For example, in a pass along attack, multiple unauthorized users provide biometric input until access to the system is achieved due to the FAR. With an FAR of 1%, a sequence of 500 false inputs results in a probability of approximately 99.4% (e.g., $0.994 \approx 1-(1-0.01)^{500}$) that an unauthorized user will gain access to the electronic device. Additionally, in response to an attempted hack attack or repeated unsuccessful attempts at authentication, some authentication algorithms may disable an input device or otherwise prevent or limit access to the device which may be inconvenient for an authorized user falsely identified as an unauthorized user.

SUMMARY

An example of a method of controlling access to an electronic device based on biometric input includes receiving a current biometric input, determining one or more template similarity scores for the current biometric input, if at least one template similarity score of the one or more template similarity scores satisfies a template similarity score criterion, then updating a false user counter value in a first numerical direction and performing an authentication process on the current biometric input, else, determining one or more stored biometric input similarity scores for the current biometric input, if at least one stored biometric input similarity score of the one or more stored biometric input similarity scores satisfies a stored biometric input similarity score criterion, then maintaining the false user counter value, else, replacing a previously stored biometric input with the current biometric input, and updating the false user counter value in a second numerical direction opposite to the first numerical direction.

Implementations of such a method may include one or more of the following features. The method may include maintaining the false user counter value at a current value for a previous unauthorized user of the electronic device and updating the false user counter value in the second numerical direction for a new unauthorized user of the electronic device. The template similarity score criterion may be a first template similarity score criterion and the method may include determining the one or more template similarity scores by determining a similarity between the current biometric input and one or more previously stored biometric templates and, if the at least one template similarity score satisfies the first template similarity score criterion, then authenticating a user of the electronic device based on one template similarity score of the one or more template similarity scores satisfying a second template similarity score criterion, wherein the first template similarity score criterion corresponds to a first confidence value threshold and the second template similarity score criterion corresponds to a second confidence value threshold, the second confidence value threshold being higher than the first confidence value threshold. The method may include determining a plurality of template similarity scores for a plurality of authorized users of the electronic device. The method may include determining the one or more stored biometric input similarity scores for the current biometric input by determining a similarity between the current biometric input and one or more stored biometric inputs. The method may include determining if the false user counter value satisfies a disallowed re-entry of biometric input criterion based on the false user counter threshold value and, if the false user counter value satisfies the disallowed re-entry of biometric input criterion, then disallowing re-entry of biometric input, else allowing the re-entry of biometric input without implementing denial of service procedures. The method may include replacing the previously stored biometric input with the current biometric input comprises replacing a previously stored biometric input corresponding to an unauthorized user of the electronic device with the current biometric input. The method may include, if the at least one stored biometric input similarity score satisfies the stored biometric input similarity score criterion, then discarding the current biometric input. The current biometric input may include at least one of a fingerprint, a retinal scan, a voice recording, or a facial image.

An example of an apparatus for determining access to an electronic device based on biometric authentication includes a memory and at least one processor operably coupled to the memory and configured to receive a current biometric input, determine one or more template similarity scores for the current biometric input, if at least one template similarity score of the one or more template similarity scores satisfies a template similarity score criterion, then update a false user counter value in a first numerical direction and perform an authentication process on the current biometric input, else, determine one or more stored biometric input similarity scores for the current biometric input, if at least one stored biometric input similarity score of the one or more stored biometric input similarity scores satisfies a stored biometric input similarity score criterion, then maintain the false user counter value, else, replace a previously stored biometric input with the current biometric input, and update the false user counter value in a second numerical direction opposite to the first numerical direction.

Implementations of such an apparatus may include one or more of the following features. The at least one processor may be further configured to maintain the false user counter value at a current value for a previous unauthorized user of the electronic device and update the false user counter value in the second numerical direction for a new unauthorized user of the electronic device. The template similarity score criterion may be a first template similarity score criterion and the at least one processor may be further configured to determine a similarity between the current biometric input and one or more previously stored biometric templates and determine the one or more template similarity scores based on the determined similarity between the current biometric input and the one or more previously stored biometric templates and, if the at least one template similarity score satisfies the first template similarity score criterion, then authenticate a user of the electronic device based on one template similarity score of the one or more template similarity scores satisfying a second template similarity score criterion, wherein the first template similarity score criterion corresponds to a first confidence value threshold and the second template similarity score criterion corresponds to a second confidence value threshold, the second confidence value threshold being higher than the first confidence value threshold. The at least one processor may be further configured to determine a plurality of template similarity scores for a plurality of authorized users of the electronic device. The at least one processor may be further configured to determine a similarity between the current biometric input and one or more stored biometric inputs and determine the one or more stored biometric input similarity scores for the current biometric input based on the determined similarity between the current biometric input and the one or more stored biometric inputs. The at least one processor may be further configured to determine if the false user counter value satisfies a disallowed re-entry of biometric input criterion based on the false user counter threshold value and, if the false user counter value satisfies the disallowed re-entry of biometric input criterion, then disallow re-entry of biometric input, else allow the re-entry of biometric input without implementing denial of service procedures. The at least one processor may be further configured to replace a previously stored biometric input corresponding to an unauthorized user of the electronic device with the current biometric input. The at least one processor may be further configured to discard the current biometric input if the at least one stored biometric input similarity score satisfies the stored biometric input similarity score criterion. The current biometric input may include at least one of a fingerprint, a retinal scan, a voice recording, or a facial image.

An example of an apparatus for controlling access to an electronic device based on biometric input includes means for receiving a current biometric input, means for determining one or more template similarity scores for the current biometric input, means for updating a false user counter value in a first numerical direction and performing an authentication process on the current biometric input, if at least one template similarity score of the one or more template similarity scores satisfies a template similarity score criterion, means for determining one or more stored biometric input similarity scores for the current biometric input if the at least one template similarity score of the one or more template similarity scores does not satisfy the template similarity score criterion, means for maintaining the false user counter value if at least one stored biometric input similarity score of the one or more stored biometric input similarity scores satisfies a stored biometric input similarity score criterion, and means for replacing a previously stored biometric input with the current biometric input and updating the false user counter value in a second numerical direction opposite to the first numerical direction if the at least one stored biometric input similarity score of the one or more stored biometric input similarity scores does not satisfy the stored biometric input similarity score criterion.

Implementations of such an apparatus may include one or more of the following features. The apparatus may include means for maintaining the false user counter value at a current value for a previous unauthorized user of the electronic device and means for updating the false user counter value in the second numerical direction for a new unauthorized user of the electronic device. The template similarity score criterion may be a first template similarity score criterion and the apparatus may include means for determining the one or more template similarity scores by determining a similarity between the current biometric input and one or more previously stored biometric templates, means for authenticating a user of the electronic device based on one template similarity score of the one or more template similarity scores satisfying a second template similarity score criterion if the at least one template similarity score satisfies the first template similarity score criterion, wherein the first template similarity score criterion corresponds to a first confidence value threshold and the second template similarity score criterion corresponds to a second confidence value threshold, the second confidence value threshold being higher than the first confidence value threshold. The apparatus may include means for determining a plurality of template similarity scores for a plurality of authorized users of the electronic device. The apparatus may include means for determining the one or more stored biometric input similarity scores for the current biometric input by determining a similarity between the current biometric input and one or more stored biometric inputs. The apparatus may include means for determining if the false user counter value satisfies a disallowed re-entry of biometric input criterion based on the false user counter threshold value, means for disallowing re-entry of biometric input if the false user counter value satisfies the disallowed re-entry of biometric input criterion, and means for allowing the re-entry of biometric input without implementing denial of service procedures if the false user counter value does not satisfy the disallowed re-entry of biometric input criterion. The apparatus may include means for replacing the previously stored biometric input with the current biometric input comprises means for replacing a previously stored biometric input corresponding to an unauthorized user of the electronic device with the current biometric input. The apparatus may include means for discarding the current biometric input if the at least one stored biometric input similarity score satisfies the stored biometric input similarity score criterion.

The current biometric input includes at least one of a fingerprint, a retinal scan, a voice recording, or a facial image.

An example of a non-transitory processor-readable storage medium comprising processor-readable instructions configured to cause a processor to control access to an electronic device based on biometric input includes code for receiving a current biometric input, code for determining one or more template similarity scores for the current biometric input, code for updating a false user counter value in a first numerical direction and code for performing an authentication process on the current biometric input, if at least one template similarity score of the one or more template similarity scores satisfies a template similarity score criterion, code for determining one or more stored biometric input similarity scores for the current biometric input if the at least one template similarity score of the one or more template similarity scores does not satisfy the template similarity score criterion, code for maintaining the false user counter value if at least one stored biometric input similarity score of the one or more stored biometric input similarity scores satisfies a stored biometric input similarity score criterion, and code for replacing a previously stored biometric input with the current biometric input and code for updating the false user counter value in a second numerical direction opposite to the first numerical direction, if the at least one stored biometric input similarity score of the one or more stored biometric input similarity scores does not satisfy the stored biometric input similarity score criterion.

Implementations of the storage medium may include one or more of the following features. The processor-readable instructions may be further configured to maintain the false user counter value at a current value for a previous unauthorized user of the electronic device and update the false user counter value in the second numerical direction for a new unauthorized user of the electronic device. The template similarity score criterion may be a first template similarity score criterion and the processor-readable instructions may be further configured to determine the one or more template similarity scores by determining a similarity between the current biometric input and one or more previously stored biometric templates and authenticate a user of the electronic device based on one template similarity score of the one or more template similarity scores satisfying a second template similarity score criterion if the at least one template similarity score satisfies the first template similarity score criterion, wherein the first template similarity score criterion corresponds to a first confidence value threshold and the second template similarity score criterion corresponds to a second confidence value threshold, the second confidence value threshold being higher than the first confidence value threshold. The processor-readable instructions may be further configured to determine a plurality of template similarity scores for a plurality of authorized users of the electronic device. The processor-readable instructions may be further configured to determine a similarity between the current biometric input and one or more stored biometric inputs and determine the one or more stored biometric input similarity scores for the current biometric input based on the determined similarity between the current biometric input and the one or more stored biometric inputs. The processor-readable instructions may be further configured to determine if the false user counter value satisfies a disallowed re-entry of biometric input criterion based on the false user counter threshold value and, if the false user counter value satisfies the disallowed re-entry of biometric input criterion, then disallow re-entry of biometric input, else allow the re-entry of biometric input without implementing denial of service procedures. The processor-readable instructions may be further configured to replace a previously stored biometric input corresponding to an unauthorized user of the electronic device with the current biometric input. The processor-readable instructions may be further configured to discard the current biometric input if the at least one stored biometric input similarity score satisfies the stored biometric input similarity score criterion. The current biometric input may include at least one of a fingerprint, a retinal scan, a voice recording, or a facial image.

Items and/or techniques described herein may provide one or more of the following capabilities and/or possibly one or more other capabilities not mentioned. Similarity scores for a current biometric input and previously stored biometric information can be determined by a biometric authentication module. The previously stored biometric information can include biometric templates and biometric input. The previously stored biometric information can support one or more authorized users of the electronic device. The similarity scores can include biometric template similarity scores and biometric input similarity scores. The biometric input similarity scores can indicate an unauthorized user of the electronic device. Further, the biometric input similarity scores can indicate that the unauthorized user is a new unauthorized user of the electronic device rather than a previous unauthorized user of the electronic device. In this case, the capability is provided to disallow device access and to update the false user counter value to approach and/or cross a false user counter threshold for the new unauthorized user. Further, the capability is provided to maintain the false user counter value for the previous unauthorized user. The biometric authentication module can update a biometric input database in a manner that facilitates accurate determination of the new and/or previous unauthorized users while conserving storage capacity on the electronic device or on a server. Managing the false user counter value and the updates of the biometric input database in this manner may enhance protection against, for example, a pass-along attack and reduce inconvenience for the authorized user of the device with regard to denial of service procedures. Further, it may be possible for an effect noted above to be achieved by means other than those noted and a noted item/technique may not necessarily yield the noted effect.

DETAILED DESCRIPTION

Figure 1:
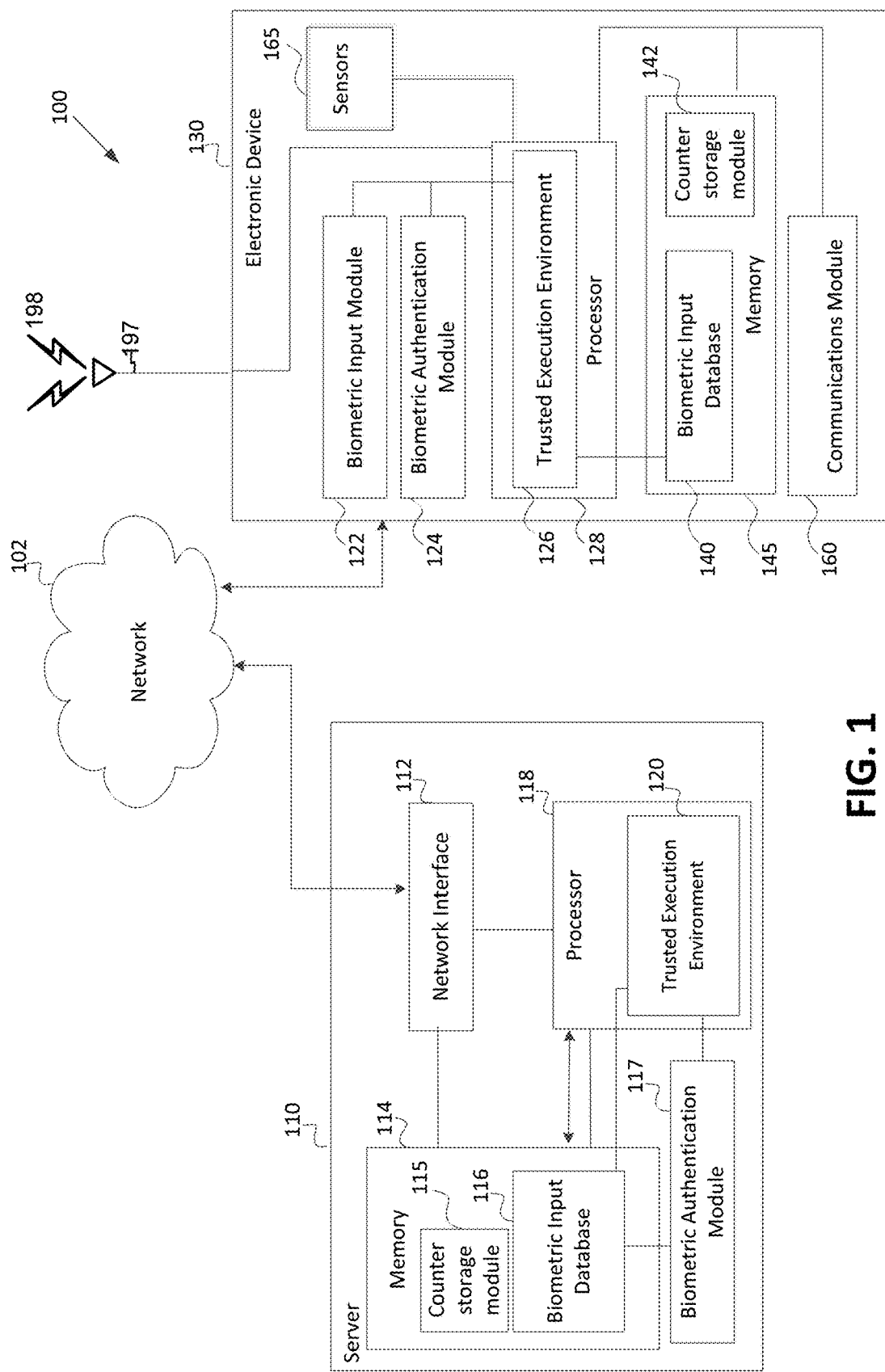
FIG. 1 is a simplified block diagram of network components.

Techniques disclosed herein are configured to improve the integrity, performance and user convenience of biometric security processes on data processing devices.

A current biometric input is received at an electronic device. Based on the current biometric input and previously stored biometric information, similarity scores for the current biometric input are determined, for example, by a biometric authentication module of the electronic device. The previously stored biometric information may include biometric templates for one or more authorized users and biometric input for one or more authorized and/or unauthorized users. The similarity scores may include biometric template similarity scores and biometric input similarity scores. Allowed or disallowed device access is determined based on the similarity scores. The biometric authentication module may determine a current user status as an authorized user, a previous unauthorized user, or a new unauthorized user of the electronic device. Based on the determination of the current user status, the current biometric input is conditionally stored in a biometric input database and denial of service procedures are conditionally implemented.

In response to biometric input that is insufficiently similar to a stored template, an authentication system of an electronic device may, for example, implement denial of service procedures. For example, denial of service procedures may include, but are not limited to, throttling security procedures, secondary authentication, or a combination thereof. These responses may occur after exceeding a limitation on a number of unsuccessful attempts at gaining access to the device by authentication of biometric input. For example, if the limitation on the number of unsuccessful attempts is reached, the throttling security procedure may be an exponential back-off or doubling back-off. This may impose an exponentially increasing time gap or a doubled time gap (e.g., 1 second, 2 seconds, 4 seconds, etc.) between allowed attempts. As another example, access to the device may be denied until a user completes secondary authentication. Secondary authentication may include a knowledge based security procedure (e.g., the user answers a pre-determined security question) or a step-up authentication procedure (e.g., the user enters a password supplied to the user by a managing entity of the device and/or enters a different type of biometric input). However, these techniques for limiting access to the device are at best inconvenient for the authorized user. For example, an authorized user may realize after several failed attempts at gaining access to the device via a fingerprint authentication that their fingers are dirty. It is more convenient for such a user to wash their hands and re-enter the fingerprint than to have the time to re-entry delayed and/or than to have required entry of additional security information. Furthermore, the security associated with the secondary authentication is typically lower than the biometric input. For example, if a hacker has possession of the device and/or access to a user account or personal information, they may intercept or determine the password or the answer to the pre-determined security question. Therefore, an authentication system that does not limit the number of access attempts by a user that is likely the authorized user is desirable in terms of user convenience. Further, user convenience and security may be enhanced by reducing the propensity of the authentication system to require denial of service procedures. Additionally, an authentication system that can offer such convenience while providing protection against hack attacks, such as, for example, pass along attacks, is further desirable.

Referring to FIG. 1, a simplified block diagram of network components 100 is shown. A quantity of each component in FIG. 1 is an example only and other quantities of each, or any, component could be used. The network components 100 includes a server 110 communicatively coupled to an electronic device 130 via a network 102.

The electronic device 130 may be, for example, but not limited to a mainframe, a mini-computer, a server, a workstation, a set-top box, a personal computer, a laptop computer, a mobile device, a hand-held device, a wireless device, a tablet, a modem, an electronic reader, a personal digital assistant, an electronic game, an automobile, an aircraft, a machinery, etc. The electronic device 130 includes a biometric input module 122, a processor 128, a memory 145, a communications module 160, and sensors 165. The processor 128 may include a trusted execution environment (TEE) 126, a biometric input database 140 and/or a biometric authentication module 124. Although shown as separate entities for simplicity, the biometric authentication module 124 may be part of the processor 128 and may be implemented wholly or in part by the TEE 126. The server 110 may be co-located with the electronic device 130 or may be at a remote location. The server 110 includes a memory 114, a processor 118, and a network interface 112. The processor 118 may include a TEE 120, a biometric input database 116 and/or a biometric authentication module 117. Although shown as separate entities for simplicity, the biometric authentication module 117 may be part of the processor 118 and may be implemented wholly or in part by the TEE 120. Functions and capabilities of the biometric authentication module 124 apply to the biometric authentication module 117 and vice versa. Further, in an embodiment, the functions and capabilities of the biometric authentication modules 124 and 117 may be shared.

The processors 118 and 128 are physical processors (i.e., an integrated circuit configured to execute operations on the server 110 or the electronic device 130 as specified by software and/or firmware). The processors 118, 128 may be intelligent hardware devices, e.g., a central processing unit (CPU), one or more microprocessors, a controller or microcontroller, an application specific integrated circuit (ASIC), a general-purpose processor, a digital signal processor (DSP), a field programmable gate array (FPGA) or other programmable logic device, a state machine, discrete gate or transistor logic, discrete hardware components, or any combination thereof designed to perform the functions described herein and operable to carry out instructions on server 110 and/or the electronic device 130. The processors 118, 128 may be one or more processors. The processors 118, 128 may be implemented as a combination of computing devices, e.g., a combination of DSP and a microprocessor, a plurality of microprocessors, one or more microprocessors in conjunction with a DSP core, or any other such configuration. The processors 118,128 along with respective memory 114, 145 may be components of a system-on-chip (SoC). The processors 118, 128 may include multiple separate physical entities that may be distributed in the server 110 and/or the electronic device 130. The processors 118, 128 support a system-wide trusted execution environment (TEE) security technology. Example implementations of the TEE include, but are not limited to, Open Source TEE (OP-TEE) and QUALCOMM® Secure Extension Environment (QSEE), and ARM®TrustZone® (TZ). TZ is a TEE security specification that, when incorporated into an ARM® enabled processor, partitions hardware and software resources of the processors 118, 128 and the respective memory 114, 145. Other examples of TEE security specifications include Intel® TXT and AMD® Secure Execution Environment. In addition to unauthorized device access, hacker attacks potentially result in the loss of biometric data and unauthorized access to other sensitive data. Therefore, biometric authentication may utilize software implemented in the TEE to minimize such attacks.

The processors 118 and 128 are operably coupled, respectively, to the memory 114 and the memory 145. The memory 114 and the memory 145 refer generally to any type of computer storage medium, including but not limited to RAM, ROM, FLASH, disc drives, etc. The memory 114 and/or 145 may be long term, short term, or other memory associated with the server 110 and/or the electronic device 130 and is not to be limited to any particular type of memory or number of memories, or type of media upon which memory is stored. The memory 114, 145 are non-transitory, processor-readable storage media that store processor executable and processor-readable instructions (i.e., software code) that are configured to, when executed, cause the processor 118, 128 to perform various functions described herein (although the description may refer only to the processor 118,128 performing the functions). Alternatively, the software code may not be directly executable by the processor 118, 128 but configured to cause the processor 118, 128, e.g., when compiled and executed, to perform the functions. The memory 114 and/or the memory 145 may further provide storage of information obtained by the biometric input module 122 and/or the processor 128. The functions of the memory 145 as described herein are substantially the same as the functions of the memory 114. Thus references to and explanations of the memory 145 are considered to apply to the memory 114.

The memory 145 may include a counter storage module 142 for storage of a false user counter value. Similarly, the memory 114 of the server 110 may include a counter storage module 115. In various implementations, the biometric authentication module 124 may initialize the false user counter value as part of owner registration procedures, for example during an enrollment process, at an initial power-on, at a power-on reset, in response to a user command, at particular pre-determined time intervals, or combinations thereof. For example, the biometric authentication module 124 may initialize the false user counter value in response to disallowed re-entry of biometric input in combination with or in sequence with implementation of denial of service procedures and/or secondary authentication. The initial value of the false user counter and/or the particular initialization procedure may depend on security requirements for the device. The false user counter value may indicate a number of unauthorized users that have attempted to access the electronic device 130 using biometric input. The false user counter value may or may not be equivalent to a number of unsuccessful attempts to access the electronic device 130. For example, in a pass along hacking procedure, the electronic device 130 may be passed to multiple unauthorized users with each unauthorized user making one or more attempts to access the electronic device 130. The false user counter value may be updated to approach and/or cross a predetermined false user counter threshold for each new unauthorized person attempting to gain access to the electronic device 130. As described in further detail below, the user may be determined to be unauthorized and new based on similarity scores for a current biometric input with respect to biometric templates and stored biometric inputs. The number of false users may be less than the number of failed attempts to access the electronic device 130 if one or more false users make multiple attempts to access the electronic device 130.

The communications module 160 is configured to enable the electronic device 130 to send and receive wireless signals 198 for example via a wireless antenna 197 over a network 102. The communications module 160 may be further configured to communicate and exchange information, including but not limited to location information, either directly or indirectly with other network entities, including but not limited to, the server 110, access points, base stations, navigation servers, location servers, other electronic devices 130, etc. The communications module 160 may also be to receive signals from satellite vehicles (SVs) belonging to one or more Satellite Positioning Systems (SPSs), such as the GPS system, the GLONASS system, the Galileo system, and/or other SPSs.

The sensors 165 may include, but are not limited to, one or more of a clock, an ambient light sensor (ALS), an accelerometer, a gyroscope, a magnetometer, a temperature sensor, a barometric pressure sensor, a red-green-blue (RGB) color sensor, an ultra-violet (UV) sensor, a UV-A sensor, UV-B sensor, compass, proximity sensor, near field communication (NFC), and/or Global Positioning Sensor (GPS), a microphone, a camera, and/or a wireless subsystem (e.g., BLUETOOTH, WIFI, cellular, etc.). As used herein, the sensors may also include an input device such as a touchscreen, keyboard, mouse, joystick, etc. The sensors may provide environmental information, position information, motion information, and/or other information indicative of a device user and/or usage conditions for the electronic device 130. The sensors 165 may be coupled to the processor 128. The processor 128 may collect and analyze sensor information to determine typical usage conditions for the one or more authorized users of the electronic device 130. In an embodiment, the processor 128 may use this information to detect usage conditions that may indicate usage by an unauthorized user and/or that may indicate a change in the user of the electronic device 130.

The network interface 112 includes an interface for wireless and/or wired network communications via the network 102. The network interface 112 enables communications between the server 110 and one or more electronic devices 130. The network interface 112 may be further configured to communicate and exchange information, including but not limited to location information, either directly or indirectly with other network entities, including but not limited to, access points, base stations, navigation servers, location servers, other servers, etc.

Examples of the network 102 include but are not limited to a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a BLUETOOTH network, an IEEE 802.15x, for example. Wireless communication networks may include so-called next generation technologies (e.g., "4G"), such as, for example, Long Term Evolution (LTE), Advanced LTE, WiMax, Ultra Mobile Broadband (UMB), and/or the like.

The biometric input module 122 (e.g., means for receiving a current biometric input) may include, for example but not limited to, fingerprint technology, iris or retina eye-scan technology, facial recognition technology, hand geometry technology, spectral biometric technology, voice recognition technology, and/or combinations thereof. A biometric is a physiological characteristic that provides a distinctive, measurable identifier of an individual. A biometric input may include a fingerprint, palm vein information, a facial image, DNA information, a palm print, iris recognition, a retina scan, a voice recording, etc. To the extent the present description describes fingerprint based systems, such description is intended to be but one example of a suitable system. The scope is not so limited. Examples of the biometric input module 122 may include an optical, injected radio frequency (RF), or capacitive scanner disposed in a housing which provides a contact area where placed or swiped fingerprints are captured. In an exemplary embodiment, the biometric input module 122 includes one or more cameras or scanners to capture images of a biometric or multiple biometrics. In an example, the biometric input module 122 may include a multimodal biometric sensor. The multimodal biometric sensor can obtain multiple images from a same biometric (i.e., multiple images of an iris, or scans of the same finger) or obtain information from different biometrics (scan of multiple fingers or scan of fingerprints along with voice recognition or face recognition). Multimodal biometric systems can obtain the biometric data of multiple biometrics sequentially, simultaneously, or a combination thereof. The biometric input module 122 may use two-dimensional or three dimensional imaging techniques or other type of sensors to capture the biometric data input of a biometric or multiple biometrics. The biometric input module 122 may also include other sensors for anti-spoofing, such as temperature, movement and blood pressure sensors.

The biometric input module 122 may collect biometric input information and send the collected biometric input information to the biometric authentication module 124 (e.g., means for determining one or more template similarity scores, means for updating a false user counter value, means for performing an authentication process, means for determining one or more stored biometric input similarity scores, means for maintaining the false user counter value, means for replacing a previously stored biometric input). In an embodiment, the communications module 160 may receive the biometric input information from the biometric input module 122 and send the biometric input information to the biometric authentication module 117 of the server 110 via the network 102. The communications module 160 may cryptographically encode or otherwise securely encode the biometric input information prior to sending this information to the server 110.

Figure 2:
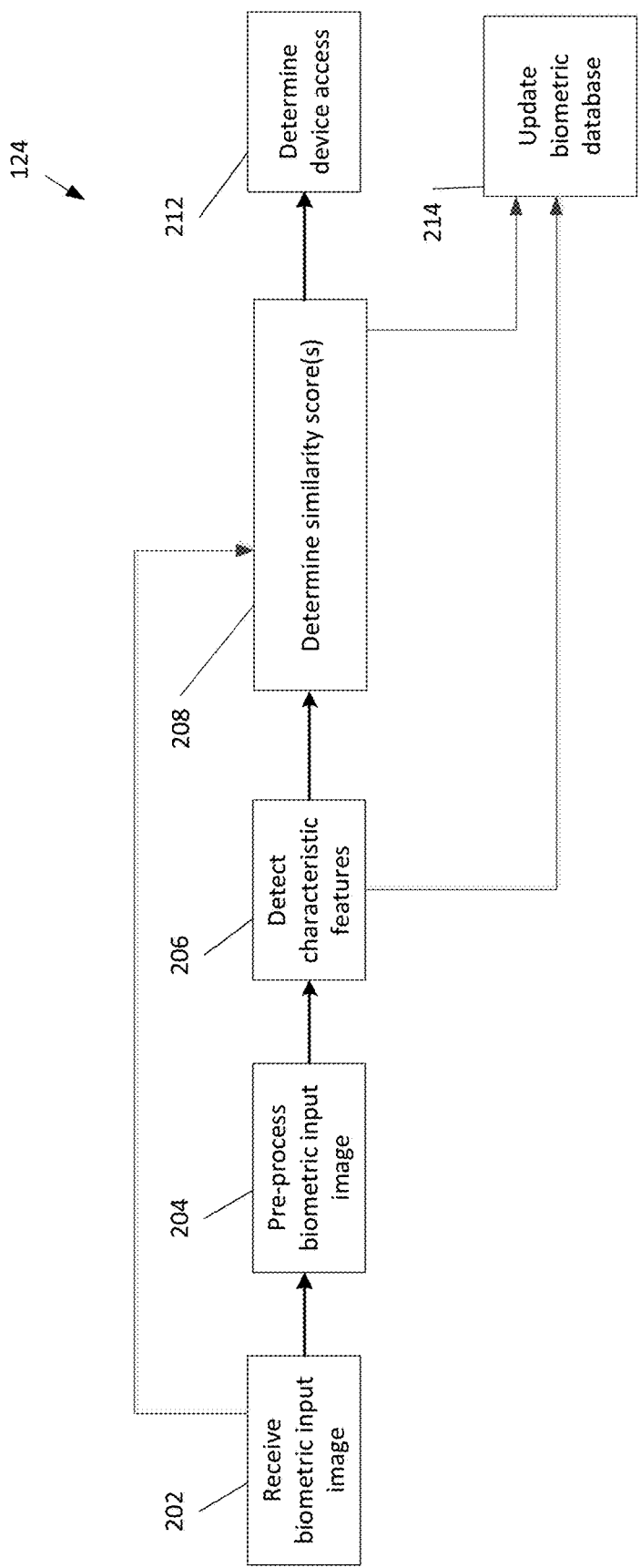
FIG. 2 is a functional block diagram of an example of the biometric authentication module of FIG. 1.

The biometric authentication module 124 may perform functions related to authentication, determination of similarity scores, biometric input storage, and determination of device access. Referring to FIG. 2, with further reference to FIG. 1, a functional block diagram of an example of the biometric authentication modules 124 and 117 includes the functional stages shown. The modules 124 and 117 are examples only and not limiting. The modules 124 and/or 117 may be altered, e.g., by having functional stages added, combined, removed, or rearranged. The processors 128, 118 and/or TEEs 126, 120 are configured to implement processes of the biometric authentication module 124 including storing various outputs of the biometric authentication module 124 in the memory 145 (e.g., in the biometric input databases 140). The TEE 126 operating within the processor 128 and the memory 145 and/or the processor 128 outside of the TEE 126 may be configured to execute the functional stages of the biometric authentication module 124. On the server 110, the TEE 120 operating within the processor 118 and the memory 114 and/or the processor 128 outside of the TEE 120 may be configured to execute the functional stages of the biometric authentication module 117 in a manner substantially similar to that described below for the biometric authentication module 124. The functions of the biometric authentication module 124 as described herein are substantially the same as the functions of the biometric authentication module 117. Thus references to and explanations of the biometric authentication module 124 are considered to apply to the biometric authentication module 117.

Figure 3A:
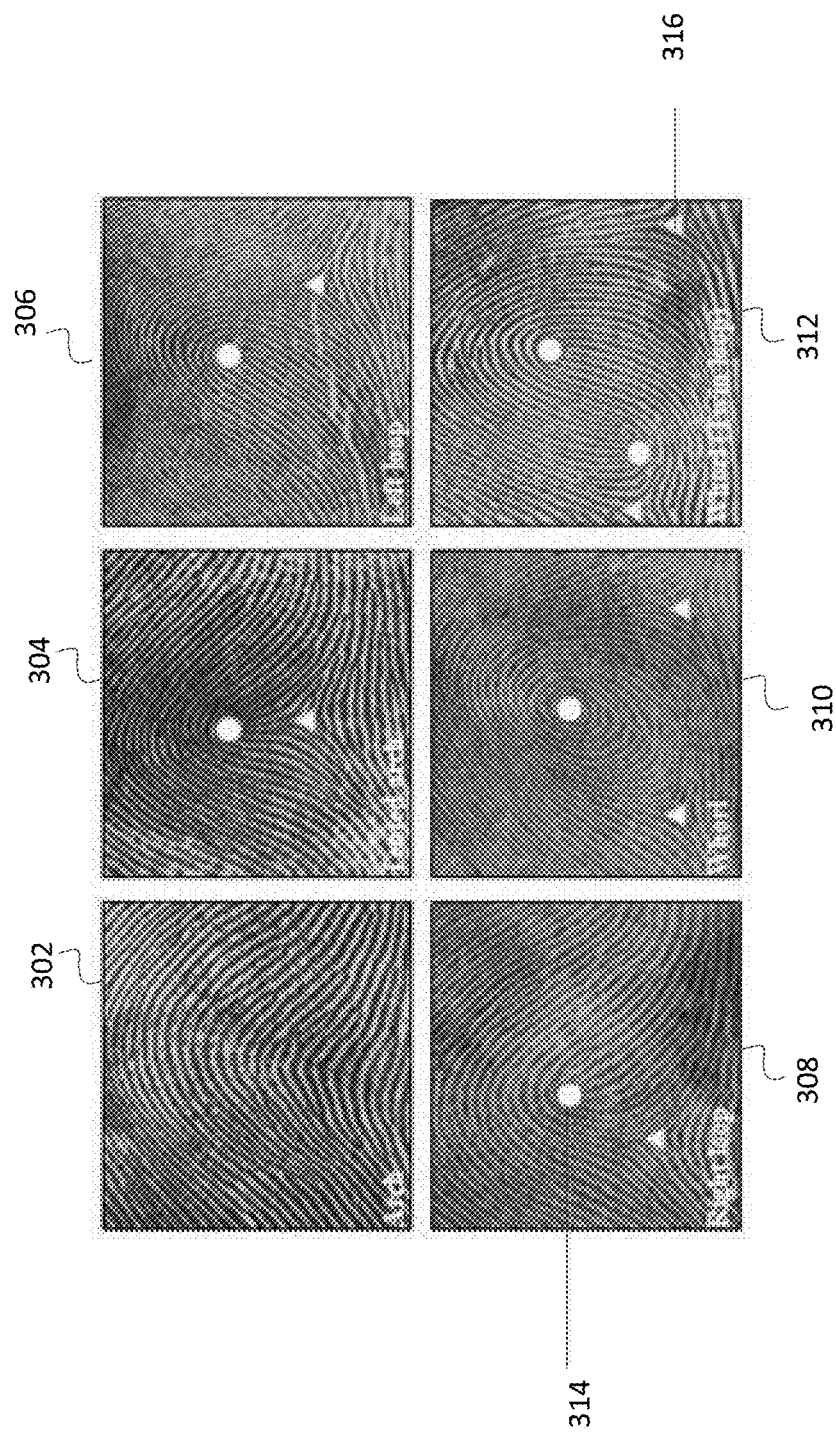
FIG. 3A is a schematic block diagram of examples of fingerprints captured by the biometric input module of FIG. 1.

At stage 202, the biometric authentication module 124 is configured to receive the raw biometric input from the biometric input module 122. The biometric input may correspond to a current biometric input entered for device access. Alternatively or additionally, the biometric input may correspond to a current biometric input entered as part of an initialization or enrollment procedure for the electronic device 130. For example, and referring to FIG. 3A, the biometric input may be one or more images of the fingerprint, as shown in FIG. 2A. The biometric input is a raw digital image of the biometric data as captured by the biometric input module 122. Fingerprints may exhibit features including, but not limited to, an arch 302, a tented arch 304, a left loop 306, a right loop 308, a whorl 310, a whorl/twin loop 312, macrosingularities (e.g., a core 314, a delta 316, etc.), and symmetry properties. An arch 302 is a fingerprint type without any macro-singularities. A tented arch 304 is a fingerprint with one core and one delta in which an axis of symmetry goes through the delta. A left loop 306 has one pair of core and delta in which the delta is in a right side of a symmetry point. A right loop 308 has one pair of core and delta in which the delta is in a left side of a symmetry point. A plain whorl 310 contains two deltas and one core. A double whorl 312 contains two cores and two deltas.

At stage 204, the biometric authentication module 124 is configured to pre-process the biometric input image. The image pre-processing at the stage 204 may combine and normalize the raw data. For the example of the fingerprint image, the pre-processing may apply gains and offsets to correct the image based on signal strength, and/or sensor quality. The pre-processing may include contrast enhancement algorithms and may remove non-fingerprint related information from the image (e.g., mask creation). Dead pixels, the areas where the pixels are not detected, may be corrected. As a further example, for a biometric input of a facial image, the pre-processing stage may include converting the image from color to black and white, adjusting the contrast of the image, etc. The pre-processed image may not include all of the data in the raw image.

Figure 3B:
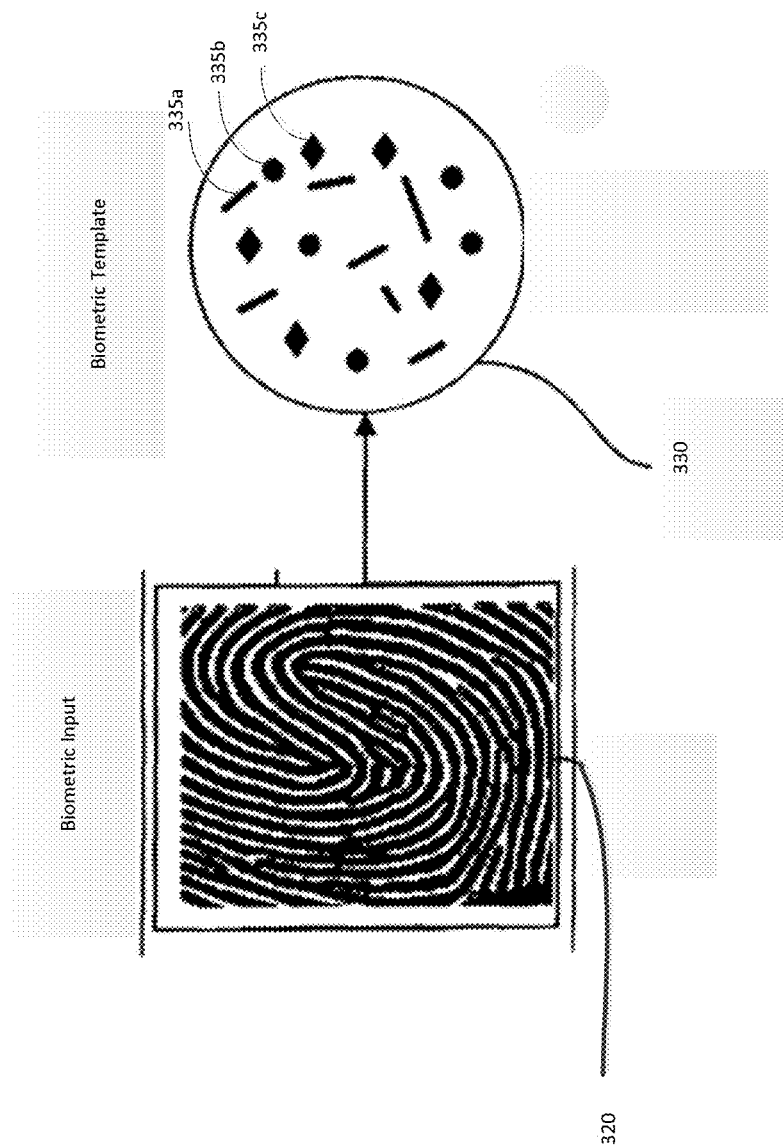
FIG. 3B is a schematic diagram of a conversion from a biometric input to a biometric template.

At stage 206, the biometric authentication module 124 is configured to detect and identify characteristic features in the pre-processed image and determine information about the characteristic features in the pre-processed image. Referring to FIG. 3B, a schematic diagram of a conversion from a biometric input to a biometric template is shown. As indicated schematically in this figure, for the example of the fingerprint biometric input, the biometric authentication module 124 may analyze and process the biometric input 320 to extract characteristic features 335*a*, 335*b*, 335*c*. These characteristic features 335*a*, 335*b*, 335*c* may correspond, for example, to the fingerprint features described above. Further, the information about these characteristic features may include, for example, location information (e.g., geometric coordinates), size information, shape information, orientation information, quantity information, etc. As other examples, voice recognition technology may provide a voice recording as the biometric input. The biometric template derived from this biometric input may include frequency band information indicating, for example, presence and/or absence of particular frequencies along with patterns of frequencies in the voice input. Face technology may provide a facial image as the biometric input. The biometric template derived from this biometric input may include color information, facial feature dimension information, facial feature location information, etc. For example, for the facial recognition technology, the features in the template may include prominent features of the current facial image biometric input such as nose size and location, ear size and location, eye size and location, etc. The biometric template for a retina eye-scan technology may include blood vessel location and pattern information as derived from a biometric input of a retinal image. The biometric template 330 is a data representation of characteristics or features extracted from the biometric input 320. As such, the biometric template 330 is derived from the biometric input 320 but is not equivalent to the biometric input. The biometric template 330 may include a subset of the features in the biometric input 320 (e.g., the detected and identified characteristic features, and/or characteristic feature information). The biometric authentication module 124 may be configured to generate the biometric template via an enrollment process that may include the stages 202, 204, and 206. During the enrollment process, the biometric template may be generated from one or more samples of biometric input and subsequently stored in memory 145.

At stage 208, the biometric authentication module 124 is configured to determine similarity scores. The similarity scores indicate the degree to which the current biometric input differs from or matches the previously stored biometric information (i.e., the biometric template and/or stored biometric input). The similarity scores may a template similarity score and/or a stored input similarity score. The template similarity score may indicate a determined similarity between the characteristic features of the current biometric input and one or more previously stored biometric templates. The comparison with the biometric template involves a comparison of the subset of features of the biometric input included in the previously stored template. The stored input similarity score may indicate a determined similarity between the raw biometric input and one or more stored biometric inputs. The comparison with the stored biometric input involves a comparison of images prior to pre-processing and may involve comparing more image features than for the template comparison. For example, the color and shadows associated with features in the current biometric input of the facial image may be compared with color and shadows in the stored biometric input of the facial image. These colors and shadows may be removed during the pre-processing to determine the template. Generally, a determined template match is more reliable match than a determined stored input match. For example, a confidence of the match between the current biometric input and the biometric template may have a smaller associated uncertainty than the confidence of the match between the biometric input and the stored biometric input. For this reason, the biometric template may form the basis for authentication rather than the stored biometric input. The characteristic features may determine match parameters. Match parameters may include a matched pair of characteristic features, matched angles, other generated match scores, feature vectors, template associations, and liveness scores. The match parameters quantify an evaluation of matched characteristics between the current biometric input and the previously stored biometric information (e.g., the biometric template and/or the stored biometric input). It is understood by a person skilled in the art that a template is commonly produced from at least one biometric input, and that it comprises features that are pertinent to identifying the user from whom the biometric inputs were obtained. In contrast, a biometric input is typically a representation of a single session input from a sensor, and typically, may have more noise than a template does.

Other methods of determining a match between the current biometric input and the previously stored biometric information include those described in U.S. patent application Ser. No. 14/679,840 filed on Apr. 6, 2015 entitled "System and Method for Hierarchical Cryptographic Key Generation Using Biometric Data," as incorporated by reference in its entirety herein. These methods include traversing a decision tree relating to presence and relative location of minutiae. For example, various levels of hierarchy of biometric descriptors, e.g., a first level, a second level, etc., are obtained. In an embodiment including fingerprint data, a first level of a hierarchy of biometric descriptors includes a plurality of fingerprint types and a second level of the hierarchy of biometric descriptors includes a plurality of distributions of macro-singularities. The hierarchy of biometric descriptors may further include additional lower levels, such as a third level including a plurality of third level ridge maps and a fourth level including a plurality of fourth level grid patterns. To select one of the third level ridge maps, the fingerprint data for at least one fingerprint is processed to obtain a ridge map. An orientation angle of a ridge is obtained at a plurality of points in the fingerprint data for the at least one fingerprint. The orientation angles are represented as vectors at the plurality of points to generate the ridge map. The ridge map is compared to a subset of the plurality of ridge maps at the third level of the hierarchy associated with the selected second level biometric descriptor, and a third level ridge map is selected. A third key component is obtained based on the selected third level ridge map. To select one of the fourth level grid patterns in the hierarchy, the fingerprint data is processed to obtain a grid pattern. The ridge map generated based on the fingerprint data for the at least one fingerprint is aligned with the selected third level ridge map. An m*n grid is overlaid on the ridge map, and cells in the m*n grid that meet a specified criteria are selected. A grid pattern is generated based on the selected cells. The grid pattern is compared to a subset of the plurality of grid patterns at the fourth level associated with the selected third level ridge map, and a fourth level grid pattern is selected. A fourth key component is obtained based on the selected fourth level grid pattern. The hierarchy may be pre-generated for a plurality of system users. The hierarchy may be stored at the server 110 and downloaded to the electronic device 130 upon request. The hierarchy may not include a single biometric descriptor that matches an entirety or substantial portion of the user's biometric data. For example, no biometric descriptor includes a substantial portion of the user's biometric data such that an identity of a particular biometric or user is discernable. Thus, a user's biometric data may not be discerned from a biometric descriptor or the hierarchy alone. This increases security over methods that store a small number of templates (e.g., approximately less than 10) including a user's biometric data and then match the biometric data to the templates.

In a further example, a pre-generated generic hierarchy may be created. The first two levels of the generic hierarchy may be comprised of biometric descriptors, e.g. types of fingerprints and distribution of the delta and core. To create the third level of the generic hierarchy, a plurality of ridge maps are overlaid with an m*n grid. The cells of the grid are preferably sized such that a single minutia may fit within one cell but unlikely that two minutiae would fall inside any one cell. If a minutia is located within a particular cell of the grid, then that cell is equal to "1"—otherwise the cell is equal to "0". Grid patterns may then be determined, and vectors may be mapped to the grid patterns. This process results in a plurality of generic grid patterns and corresponding generic vectors. Other criteria may be used to select cells to generate the grid patterns, e.g. number of minutiae in a cell, density of ridges, etc. The generic grid patterns may then be compared with probability data extracted from actual fingerprints. For example, density maps of minutiae may be generated based on a database of actual fingerprints and compared to the generic grid patterns. A probability distribution of minutia points may be generated based on the database of actual fingerprints. The generic grid patterns may be assigned a distribution of probabilities based on the actual fingerprint data. Some generic grid patterns may be discarded that fall outside a threshold of probability. Other characteristics of actual fingerprints may also be considered and used as constraints to generate the generic grid patterns. The generic grid patterns are mapped to generic vectors. The generic grid patterns and/or generic vectors are then inserted in the generic hierarchy as the biometric descriptors in the fourth level. Fingerprint data for the user is obtained. A grid pattern of minutiae is derived from a ridge map of a fingerprint or a set of fingerprints, and the fingerprint grid pattern is mapped to a fingerprint vector. The fingerprint vector is compared with the plurality of generic vectors in the fourth level of the generic hierarchy and it is determined whether one of the generic grid patterns is a possible match. When a match is possible, the generic vector that it is a possible match with the fingerprint vector is designated as a sparse vector. The sparse vector may either be an exact match or within a first similarity parameter to the fingerprint vector based on the fingerprint grid pattern. For example, when the similarity parameter includes a hamming distance, the sparse vector may then have a minimum hamming distance within a first specified threshold (for example min_ham is equal to or less than 2) from the fingerprint vector. Other types of similarity parameters may be used or other ways to measure similarities between the fingerprint data and the biometric descriptors may be employed.

Referring again to FIG. 2, at stage 212, the biometric authentication module 124 is configured to determine device access. The biometric authentication module 124 may be configured to compare the template similarity score and the stored input similarity score to respective predetermined thresholds (e.g., a first template similarity score threshold, $T_{1,T}$, a second similarity score threshold, $T_{2,T}$, and a stored input similarity score threshold, $T_s$). The thresholds are predetermined and/or adjusted based on particular security requirements and/or user preferences. The particular security requirements determine the level of confidence that the current biometric input matches the previously stored biometric information that is desired in order to gain access to the electronic device 130.

At stage 214, the biometric authentication module 124 is configured to update a biometric database. The biometric authentication module 124 may store biometric input received at the stage 202. Further, the biometric authentication module may store the biometric template(s) generated from the stages 202, 204, and 206. In an embodiment, the biometric authentication module 124 may also be configured to perform liveness detection. Liveness detection may rely on other information from liveness sensors (e.g., body temperature, a facial recognition device, keypad input). The output of the image was taken of a real finger.

The biometric authentication module 124 may adjust various thresholds according to particular security requirements for the electronic device 130. The biometric authentication module 124 may change and/or override one or more of the thresholds or similarity score criteria to require higher confidences and/or to adjust implementation of denial of service procedures. The desired security requirements for the electronic device 130 may be determined, for example, by an owner, user, issuer, manufacturer, etc. of the device. For example, in higher security applications, a higher confidence that the current user is the authorized user of the device may be required than in lower security applications. As another example, for devices used inside a geo-fenced area, the thresholds may be changed to reflect a reduced chance that unauthorized users are in possession of the devices. The biometric authentication module 124 may dynamically adjust the thresholds based on analysis of user access. For example, if the user of the electronic device 130 determines that device access is excessively denied for authorized users then the threshold for determining that the user is likely the authorized user may be lowered. In the reverse, if the user of the electronic device 130 determines that unauthorized users are successfully hacking into devices, then then the threshold for determining that the user is likely the authorized user may be raised. In various embodiments, the thresholds may be modified based on successful or partially successful verification by continuous authentication and/or secondary authentication including step-up authentication. In some examples, secondary authentication may by-pass biometric authentication procedures to allow access to the device.

A second similarity score threshold, $T_{2,T}$, may be set such that a template similarity score greater than or equal to $T_{2,T}$ indicates a confidence level that the current biometric input matches one previously stored biometric template that corresponds to a particular authorized user. For example, $T_{2,T}$ may be set at a 99% confidence level. In this case, a template similarity score greater than or equal to 99% authenticates the current user and allows access to the electronic device 130.

A first template similarity score threshold $T_{1,T}$ may be less than the second template similarity score threshold $T_{2,T}$. $T_{1,T}$ may be set such that a template similarity score greater than or equal to $T_{1,T}$ but less than $T_{2,T}$ indicates a satisfactory confidence level that the current user may be the single authorized user of the electronic device 130 or one of multiple authorized users. However, $T_{1,T}$ may not correspond to a high enough confidence level to authenticate. In an example, $T_{1,T}$ may be set at a <99% confidence level. In various embodiments, $T_{1,T}$ may be set at a 50% confidence level or a 30% confidence level. A template similarity score greater than $T_{1,T}$ but less than $T_{2,T}$ (e.g., between 30%-99% or between 50%-99%) may indicate that the current user is likely the authorized user(s). A template similarity score that is less than 99% (e.g., a template similarity score of 50% or 30%) may correspond to the satisfactory confidence level. $T_{1,T}$ may be value that indicates a significantly lower confidence level than would be used in a binary access decision. In other words, in a system where only one template similarity score threshold is evaluated and based on that one threshold, unrestricted device access is granted or denied, then a threshold of >99% confidence is typically desirable.

A stored input similarity score threshold, $T_s$, may be set such that a stored input similarity score greater than or equal to $T_s$ may indicate that the current user might be a previous user of the device. Similarly to the first template similarity score threshold, $T_s$ may be value that indicates a significantly lower confidence level than would be used in a binary access decision. The biometric authentication module 124 may adjust a false user counter threshold, $T_c$, based on security requirements with regard to the number of users able to attempt to gain access to the electronic device 130. A higher false user counter threshold enables more unauthorized users to attempt to gain access than a lower false user counter threshold.

Figure 4:
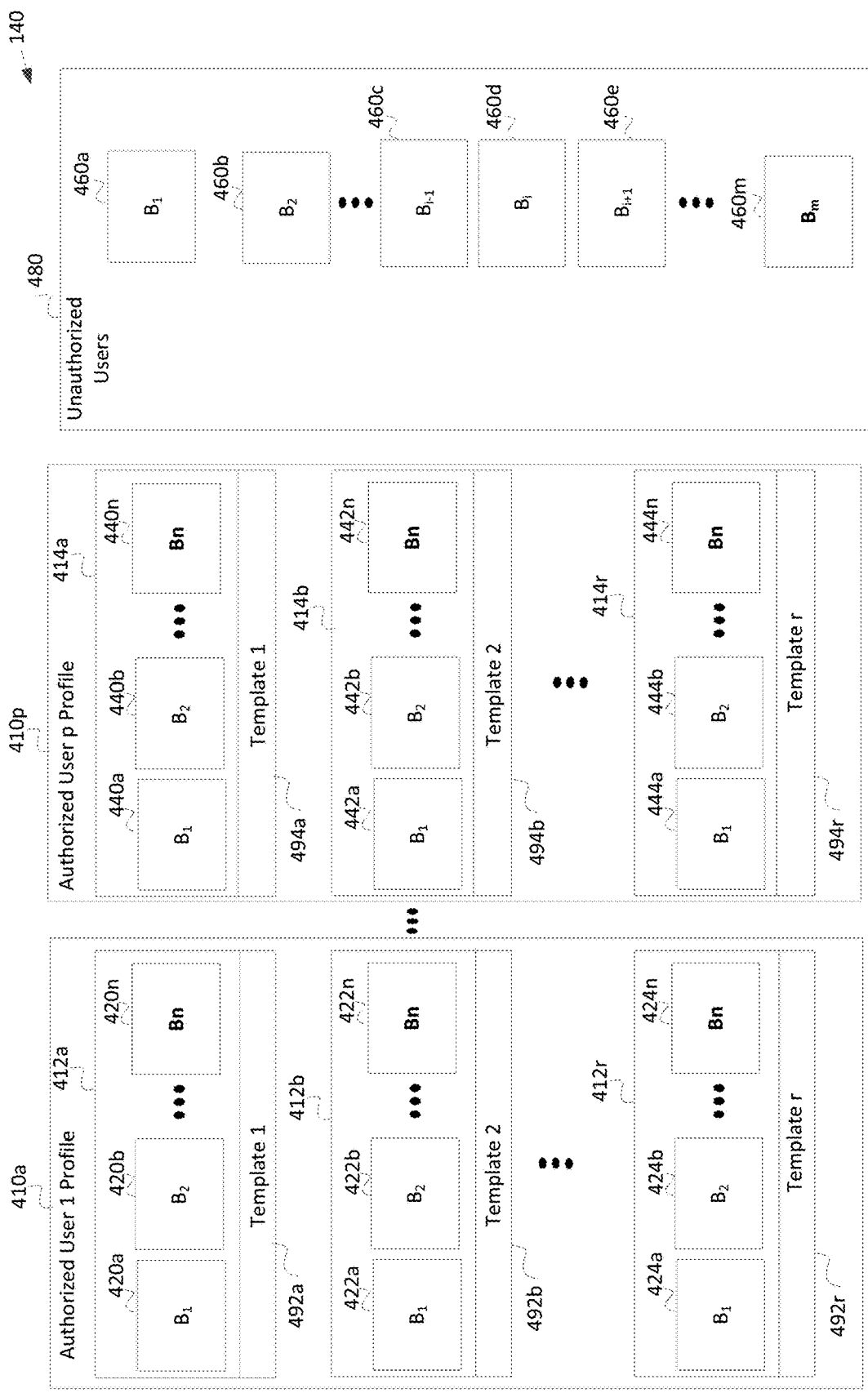
FIG. 4 is a simplified block diagram of the biometric input database of FIG. 1.

Referring FIG. 4, with further reference to FIGS. 1-3B, a simplified block diagram of a biometric input database is shown. For example, the memory 145 may include the biometric input database 140. In an implementation, the memory 114 of the server 110 may include a biometric input database 116. The biometric input database 116 may be substantially similar to the biometric input database 140 as described below with reference to FIG. 4. A quantity of each element in FIG. 4 is an example only and other quantities of each, or any, element could be used. The biometric input database 140 may be a secure repository with access control by the TEE 126, 120. The biometric input database 140 may include one or more stored biometric inputs and one or more stored biometric templates. The functions of the biometric input database 140 as described herein are substantially the same as the functions of the biometric input database 116. Thus references to and explanations of the biometric input database 140 are considered to apply to the biometric input database 116.

The biometric input database 140 may include records or profiles for one or more (e.g., 1, . . . p) candidates (e.g., record 410a for candidate 1, record 410p for candidate p, etc.). Each candidate is an authorized user of the electronic device 130. For each candidate, the biometric input database 140 includes one or more biometric templates (e.g., templates (492a, 492b, . . . , 492m) for candidate 1, templates (494a, 494b, . . . , 494m) for candidate p, etc.). The number of templates, m, for each candidate may be equal or may be different. Each template may correspond to a particular type of biometric information and/or a particular type of biometric technology (e.g., fingerprint, retina scan, voice recording, etc.). For example, a first template may correspond to an index finger fingerprint, a second template may correspond to a thumb fingerprint, a third template may correspond to a voice input, a fourth template may correspond to a right eye retina scan, a fifth template may correspond to a left eye retina scan, etc.

The biometric input database 140 may further include stored sets of biometric inputs collected or obtained by the biometric input module 122. Each set of stored biometric inputs may correspond to a respective candidate and/or a respective biometric template. The number of individual biometric inputs, n, in the set of biometric inputs may be the same or different for each set. Each set of biometric inputs includes stored biometric input collected and stored during attempts by a user of the electronic device 130 to access the device using biometric input. The stored biometric input is a received biometric input stored in the biometric input database prior to entry of a current biometric input For example, a set of biometric inputs 412a includes multiple individual biometric inputs (e.g., 420a, 420b, . . . , 420n). The set of biometric inputs 412a may correspond to the template 492a (e.g., template 1) and to the candidate record 410a (e.g., authorized user 1). Similarly, sets of biometric inputs 412b (e.g., including stored biometric inputs 422a, 422b, . . . , 422n) and 412r (e.g., including stored biometric inputs 424a, 424b, . . . , 424n) correspond, respectively, to the templates 492b and 492r for the authorized user 1 profile 410a. A $p^{th}$ authorized user may have a profile 410p that may include templates 494a, 494b, 494r and sets of stored biometric inputs 414a (e.g., including stored biometric inputs 440a, 440b, . . . , 440n), 414b (e.g., including stored biometric inputs 442a, 442b, . . . , 442n), and 414r (e.g., including stored biometric inputs 444a, 444b, . . . , 444n).

Additionally, the biometric input database 140 may include a set of stored biometric inputs 480 for unauthorized users. A number of records, M, for the unauthorized users may include 460a, 460b, 460c, 460d, 460e, 460m. The set of stored biometric inputs 480 for the unauthorized users may include stored biometric input for unauthorized users that have attempted to access the electronic device 130 using biometric input. As unauthorized users, these users may not correspond to any of the stored templates 492a, 492b, 492r, 494a, 494b, 494r.

In an embodiment, the server 110 and/or the electronic device 130 may further include a database of access history, biometric input history, threshold history, and/or counter history for one or more devices. Based on this database, the server 110 and/or the electronic device 130 may determine current actions on the electronic device 130 as likely or unlikely hack attacks. The server 110 and/or the electronic device 130 may determine a risk score indicating a likelihood that current actions correspond to a hack attack. Based on the risk score, the server 110 and/or the electronic device 130 may initiate security actions. For example, a risk score below a certain value may correspond to "no attack," a risk score between two values may correspond to "possible attack," and a risk score above another certain value may correspond to "attack-initiate security actions." These values may be set by an owner, user, issuer, or manufacturer of the device depending on specific security requirements. The biometric authentication module 124 may change and/or override one or more of the thresholds or similarity score criteria to require higher confidences and/or to adjust implementation of denial of service procedures and/or to adjust the updating procedures associated with the false user counter based on the risk score and/or the historic records.

Figure 5:
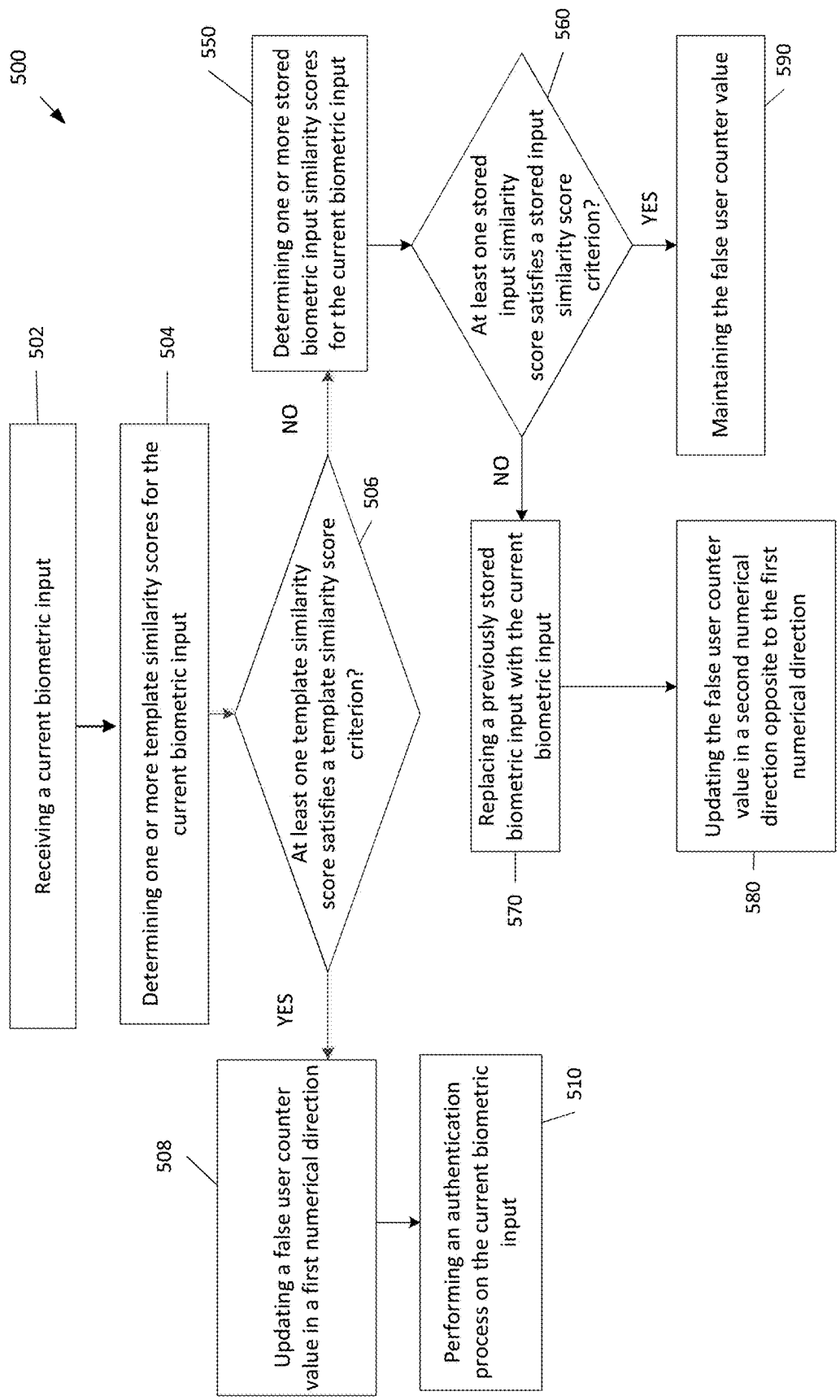
FIG. 5 is a block diagram of a method of controlling access to an electronic device based on biometric input.

Referring to FIG. 5, with further reference to FIGS. 1-4, a method of controlling access to an electronic device 130 based on biometric input includes the stages shown. The method 500 is, however, an example only and not limiting. The method 500 can be altered, e.g., by having stages added, removed, rearranged, combined, performed concurrently and/or having stages split into multiple stages.

At stage 502, the method 500 includes receiving a current biometric input. For example, the biometric input module 122 may receive the current biometric input. The biometric input module 122 may provide the current biometric input to the biometric authentication module 124 and/or the communications module 160 of the electronic device 130. Additionally or alternatively, the biometric input module 122 may store the current biometric input in the memory 145 for access by the biometric authentication module 124 and/or the communications module 160. The communications module 160 may send the current biometric input to the server 110. In this case, the processor 118 and/or the TEE 120 may save the current biometric input in the memory 114 for access by the biometric authentication module 117. In an embodiment, the biometric input module 122 may receive a plurality of current biometric inputs corresponding to different biometric technologies and/or different inputs within one technology (e.g., a retina scan and a fingerprint, an index finger fingerprint and a thumb fingerprint, etc.).

At stage 504, the method 500 includes determining one or more template similarity scores for the current biometric input. For example, the biometric authentication module 124 as implemented at least in part by the TEE 126 may determine the one or more template similarity scores. In an embodiment, the biometric authentication module 124 may determine the template similarity scores for a plurality of current biometric inputs and/or a plurality of stored biometric templates. In an example, the electronic device 130 may support multiple accounts and/or one or more authorized users (e.g., authorized users 1 through p as discussed with regard to FIG. 4) and the biometric authentication module 124 may compare the current biometric input to one or more of the plurality of stored biometric templates (e.g., templates 492a, 492b, 492r, 494a, 494b, 494r as discussed with regard to FIG. 4). In an embodiment, the multiple template similarity scores determined for multiple current biometric inputs may be combined (e.g., added, averaged, weighted, etc.) to determine a composite template similarity score.

At stage 506, the method 500 includes determining if at least one template similarity score satisfies a template similarity score criterion. The template similarity score criterion may correspond to various confidence thresholds (e.g., a 50% confidence, a 99% confidence, etc.) for the template similarity score. For example, the biometric authentication module 124 may determine if the at least one template similarity score satisfies the template similarity score criterion by comparing the template similarity score to a template similarity score threshold, $T_T$. The template similarity score may indicate a confidence that the current biometric input matches the previously stored template. $T_T$ may correspond to various confidence levels that the current user is the authorized user. For multiple stored templates corresponding to multiple authorized users of the electronic device 130, one or more of the similarity scores may satisfy the template similarity score criterion. In an embodiment, there may be multiple template similarity score thresholds for multiple authorized users of the electronic device 130. These template similarity score thresholds may be the same for all of the authorized users or may be different for one or more of the users. The template similarity score may satisfy the template similarity score criterion by indicating a match with one or more of a plurality of templates. In various implementations, the template similarity score may satisfy the template similarity score criterion by being one of less than (i.e., <), less than or equal to (i.e., ≤), greater than or equal to (i.e., ≥), or greater than (i.e., >) the template similarity score threshold. For example, the template similarity score may be greater than or greater than or equal to $T_T$ indicating that the current user is likely one of one or more authorized users of the electronic device 130. However, the template similarity score satisfying the template similarity score criterion may not uniquely identify the current user as a specific authorized user. In an embodiment, $T_T$ may correspond to a relatively low confidence level (e.g., approximately 50%) that the current user is one or more of the authorized users. In this case, satisfying the template similarity score criterion may indicate that the current user is likely at least one of one or more users of the device. However, satisfying this criterion may not be sufficient to authenticate the current user as a specific authorized user of the electronic device 130.

If at least one template similarity score does not satisfy the template similarity score criterion, then the current user is likely an imposter (i.e., a hacker and/or other unauthorized user). For example, the template similarity score may be less than or less than or equal to $T_T$ indicating that the current user is likely the unauthorized user. If at least one template similarity score satisfies the template similarity score criterion, then the method 500 branches to a stage 508. If at least one template similarity score does not satisfy the template similarity score criterion, then the method 500 branches to a stage 550.

At the stage 508, the method 500 includes updating a false user counter value in a first numerical direction. For example, the biometric authentication module 124 may update the false user counter value such that the false user counter value moves away from and/or does not cross a predetermined false user counter threshold. In other words, failure of the current attempt to access the device may not result in disallowed re-entry of biometric input. If the template similarity score satisfies the template similarity score criterion at the stage 506, then the current user is likely the authorized user. Therefore, the current user is not counted as a false user attempt to access the device with the current biometric input is not counted towards a total number of attempts before denial of service procedures are required. In other words, the current user being likely the authorized user (e.g., based on the comparison of the template similarity score with the template similarity score threshold) is sufficient to avoid a penalty. The updating of the false user counter value to approach and/or cross the false user counter threshold is not contingent on the current user being authenticated (e.g., during an authentication process at stage 510). Thus, as long as the similarity score is above $T_T$ (e.g., at the stage 506), the current attempt to access the device does not hasten the implementation of denial of service procedures. As long as at least one authorized user likely matches the current biometric input, the false user counter may be set to zero. This provides at least the following benefit. The biometric authentication module 124 may determine that one or more attempts to gain access to the electronic device 130 correspond to an unauthorized user. However, if the authorized user regains control of the electronic device 130 before the comparison between the false user counter value and the false user counter threshold value results in disallowed re-entry of biometric input, denial of service procedures, and/or secondary authentication requirements, the authorized user is not penalized or inconvenienced. Updating the false user counter value such that the counter value does not approach and/or cross the false user counter threshold may enable the authorized user is able to enter additional biometric inputs. The additional inputs may not authenticate the user but also may not invoke denial of service and/or secondary authentication requirements.

At stage 510, the method 500 includes performing an authentication process on the current biometric input. For example, the biometric authentication module 124 may perform the authentication process to determine if the current user may be authenticated as an authorized user of the electronic device 130. The authentication process is described in further detail below with regard to FIG. 7.

At the stage 550, the method 500 includes determining one or more stored biometric input similarity scores for the current biometric input. For example, the biometric authentication module 124 as implemented at least in part by the TEE 126, 120 may determine the one or more stored biometric input similarity scores. The one or more stored input similarity scores are indicative of a determined similarity between the current biometric input and at least one stored biometric input. The stored biometric input is a biometric input stored in the biometric input database prior to the biometric input module receiving the current biometric input. The at least one stored biometric input may correspond to the stored biometric inputs for the authorized users (e.g., at least one of 420a, 420b, 420n, 422a, 422b, 422n, 424a, 424b, 424n, 440a, 440b, 440n, 442a, 442b, 442n, 444a, 444b, 444n) or may correspond to the stored biometric inputs for the unauthorized users (e.g., at least one of 460a, 460b, 460c, 460d, 460e, 460m). In an embodiment, multiple stored input similarity scores may be determined for multiple biometric inputs corresponding to multiple biometric technologies. The multiple stored input similarity scores may be combined (e.g., added, averaged, weighted, etc.) to determine a composite stored input similarity score.

At stage 560, the method 500 includes determining if at least one stored biometric input similarity score satisfies a stored biometric input similarity score criterion. For example, the biometric authentication module 124 may compare the stored input similarity score to a stored input similarity score threshold, $T_s$. Based on this comparison, the biometric authentication module 124 may determine that the current user is a previous authorized user, a previous unauthorized user, or a new unauthorized user of the electronic device 130. For example, the current biometric input may not correspond to any of the stored biometric inputs in the biometric input database 140. This condition may indicate that the current user of the electronic device 130 does not correspond to any previous user of the electronic device 130 and, therefore, is a new unauthorized user of the electronic device 130. The new unauthorized user may an unrecognized user as the new unauthorized user may be unrecognized as a prior user of the electronic device 130. As another example, the current biometric input may correspond to at least one of the stored biometric inputs in the biometric input database 140. This condition may indicate that the current user of the electronic device 130 corresponds to a previous user of the electronic device 130. The previous user of the electronic device 130 may be a recognized user as the previous user may be recognized as a prior and unauthorized user of the electronic device 130. If the current biometric input corresponds to at least one of the stored biometric inputs for the unauthorized users (e.g., 460a, 460b, 460c, 460d, 460e, 460m), then the biometric authentication module may determine that the current user of the electronic device 130 is the previous unauthorized user of the electronic device 130. If the current biometric input corresponds to at least one of the stored biometric inputs for the authorized users (e.g., 420a, 420b, 420n, 422a, 422b, 422n, 424a, 424b, 424n, 440a, 440b, 440n, 442a, 442b, 442n, 444a, 444b, 444n), then the biometric authentication module may determine that the current user of the electronic device 130 as a previous authorized user of the electronic device 130. The previous authorized user may be a recognized user as the authorized user may be recognized as a prior and authorized user of the device. If the stored biometric input similarity score does not satisfy the stored biometric input similarity score criterion (e.g., the new unauthorized user), then the method 500 branches to a stage 570. If the stored biometric input similarity score satisfies the stored biometric input similarity score criterion (e.g., the previous user), then the method 500 branches to a stage 590

At the stage 570, the method 500 includes replacing a previously stored biometric input with the current biometric input. For example, the biometric authentication module 124 may replace a biometric input previously stored in the biometric input database 140 with the current biometric input. The previously stored biometric input and/or the current biometric input may correspond to an unauthorized user of the electronic device 130. Further, at least one of the one or more stored biometric input similarity scores may indicate that the current user does not correspond to the previous user(s) of the electronic device 130.

Figure 6:
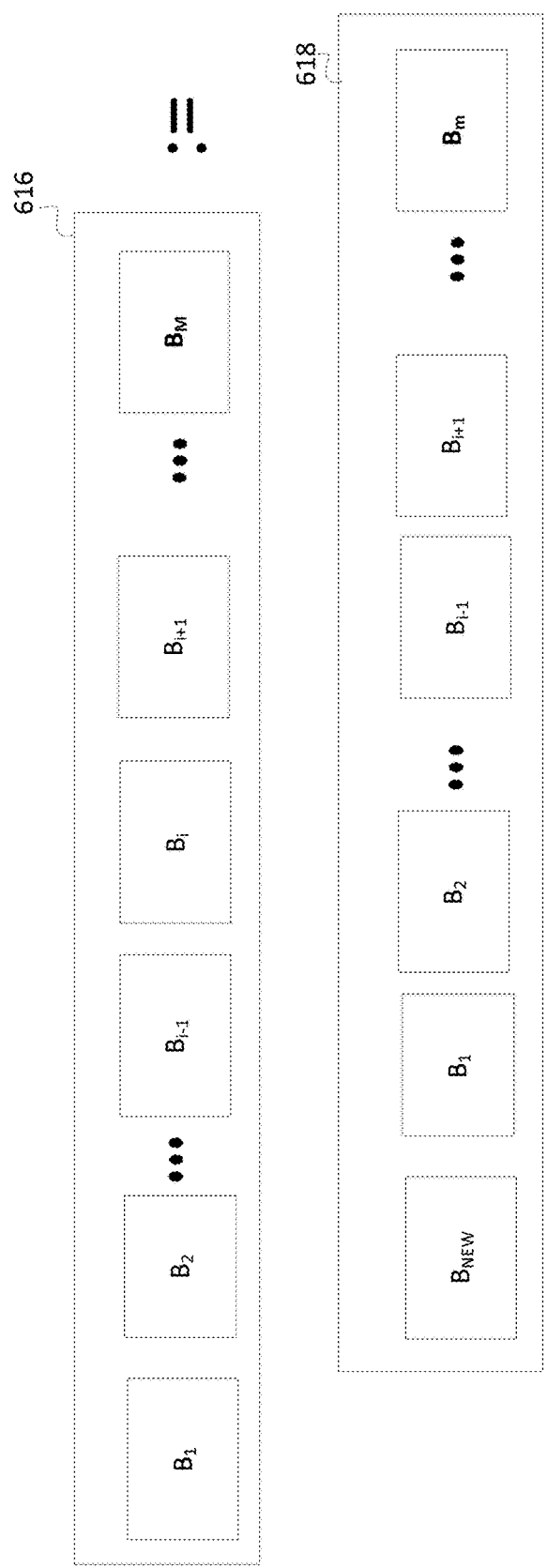
FIG. 6 is a schematic block diagram of replacing a stored biometric input.

Referring to FIG. 6, a schematic block diagram of replacing a stored biometric input is shown. The biometric database may include the sets of stored biometric inputs 616, 618 for unauthorized users. According to a caching policy, the biometric authentication module 124 may replace a previously stored biometric input, $B_i$, in the set of stored biometric inputs 616. The biometric authentication module 124 may store the current biometric input, $B_{NEW}$, in place of $B_i$ to produce the set of stored biometric inputs 618. To conserve storage space in the memory 145, the biometric authentication module 124 may implement a caching policy to erase the stored biometric input $B_i$ and replace $B_i$ with $B_{NEW}$. The storage limits as determined by the caching policy may provide the benefit of increasing a speed at which the electronic device 130 and/or the server 110 can implement the method 500.

In various implementations, the biometric authentication module 124 may select $B_i$ according to one or more criteria. The criteria may decrease a probability that the authorized user is denied access to the mobile device and increase a probability that the unauthorized user is denied access. As an example of a selection criterion, $B_i$ may be an oldest stored biometric input (i.e., a least recent) and/or may be a stored biometric input that is least similar to $B_{NEW}$. As another example of the selection criterion, $B_i$ may be the previously stored biometric input that is the least similar to the one or more biometric templates (e.g., the templates discussed with regard to FIG. 4) to which current biometric inputs are compared for purposes of determining successful authentication. To determine the relative match between $B_i$ and the one or more templates, the biometric authentication module 124 may store a match quality value. The match quality value may indicate a probability and/or other likelihood or characterization parameter that $B_i$ matches one or more of the biometric templates. The biometric authentication module 124 may determine the match quality value concurrently with receiving $B_i$ as the current input and comparing $B_i$ to the templates (e.g., at the stage 504 in FIG. 5 and/or the stage 804 in FIG. 8).

Referring again to FIG. 5, at stage 580, the method 500 includes updating the false user counter value in a second numerical direction opposite to the first numerical direction. For example, the biometric authentication module 124 may update the false user counter value. Updating the false user counter value in the first numerical direction changes the false user counter value such that the false user counter value moves away from and/or does not cross the predetermined false user counter threshold. Thus updating the false user counter in the first numerical direction rewards the current user. Updating the false user counter value in the second numerical direction opposite to the first numerical direction changes the false user counter value such that the false user counter value moves towards and/or crosses the false user counter threshold. Thus updating the false user counter in the second numerical direction penalizes the current user. In this case, the current user may be none of a likely authorized user, an authenticated user, or a previous user of the electronic device 130. Therefore, the current user is counted as a false user by the false user counter. The false user counter value may initialize at a number lower than $T_c$. For example, the false user counter value may initialize at zero and $T_c$ may be a value greater than zero. In this case, updating the false user counter value in the second numerical direction opposite to the first numerical direction may include incrementing the false user counter value (i.e., an addition operation) and/or may include setting the false user counter value to $T_c$. As another example, the false user counter value may initialize at a number greater than zero and $T_c$ may be a lesser value and/or zero. In this case, updating the false user counter value in a second numerical direction opposite to the first numerical direction may include reducing the false user counter value (i.e., a subtraction operation) and/or may include setting the false user counter value to $T_c$. The magnitude of the change in the false user counter may be a user and/or manufacturer input value and/or may depend on security requirements for the device. Further, the magnitude of the change in the false user counter may depend on the counter threshold value and a rate at which the owner, user, issuer, and/or manufacturer wants the false user counter value to reach and/or not reach the counter threshold value. In an example, the magnitude may be different for successive updates.

At the stage 590, the method 500 includes maintaining the false user counter value. For example, the biometric authentication module 124,117 may maintain (i.e., may not increment or decrement) the false user counter value at a current value. In this case, the stored biometric input similarity score satisfying the stored biometric input similarity score criterion may indicate that the current user of the electronic device 130 is recognized as a previous user of the electronic device 130 (i.e., not a new and/or unrecognized user). As the previous user, a previous biometric input corresponding to the current user may be previously saved in the biometric input database 140. As the current user is not a likely authorized user or an authenticated user and is therefore likely to be an unauthorized user, the false user counter value is not updated in the first numerical direction away from the counter threshold. However, as the current user is likely a previous user of the electronic device 130 attempting to gain access, the false user counter value is also not updated in the second numerical direction towards the counter threshold. The false user counter may not update multiple times for the same unauthorized user. In an embodiment, the stage 590 may include discarding the current biometric input. For example, the biometric input module 122 may save the current biometric input in the memory 145 and/or the memory 114. Following a determination by the biometric authentication module 124 and/or 117 that the current biometric input corresponds to a previously stored biometric input, the processor 128 and/or 118 may erase the current biometric input from the memory 145 and/or 114.

Storing biometric inputs corresponding to unauthorized users may provide benefits with regard to providing convenient and secure device access for the authorized user. As described above, the biometric authentication module 124 may store the biometric input from one or more unauthorized users during past (i.e., prior to the current attempt) and failed authentication attempts. If the current received biometric input is sufficiently similar (e.g., as determined based on the stored input similarity score) to a recently received biometric input for which the false user counter was updated to a value closer to the counter threshold value, then the biometric authentication module 124 may maintain the false user counter value. The current received biometric input and the recently received biometric input may both correspond to failed authentication attempts. Maintaining the false user counter value delays implementation of denial of service procedures (i.e., the false user counter value does not become closer in value to the false user counter threshold value).

As an alternative to maintaining the false user counter value, the biometric authentication module 124 may implement a variable counter update at the stage 590 of FIG. 5. For example the biometric authentication module 124 may change the false user counter value by a first amount based on a determined match between the current biometric input and the stored biometric input. Further the biometric authentication module 124 may change the false user counter value by a second amount based on a determined mismatch between the current biometric input and the stored biometric input. The second amount may be greater than the first amount. The first amount may bring the false user counter value to the false user counter threshold value after fewer increment iterations than the second amount. In this way, the false user counter value may reach the threshold value faster for multiple attempts by multiple and different unauthorized users than for multiple attempts by a single user. For example, ten attempts by ten different unauthorized users may result in implementation of denial of service procedures faster than ten attempts by one unauthorized user. A benefit of this variable counter update approach may be to delay or avoid implementing denial of service procedures due to an imperfect collection of biometric inputs from a legitimate user. For example, the legitimate user may have dirty fingers resulting in a determined mismatch between the fingerprint input and the fingerprint template. Another benefit of the variable counter update approach may be to delay or avoid implementing denial of service procedures in response to attempts by an unauthorized but non-malicious user. For example, a friend or relative of the legitimate user may mistake the device for their own and unintentionally attempt to access as an unauthorized user of the device. As a further benefit the variable counter update approach is that the false user counter threshold value may be closer to the initial value of the false user counter and provide higher security. The variable counter update approach may further bias the system towards rewarding benevolent users and penalizing malicious users so that malicious users are recognized as such faster than may be possible without the variable counter update approach.

Optionally, at the stage 590, the biometric authentication module may update the stored biometric inputs for the previous authorized user. For example, the biometric authentication module 124 may update the biometric inputs previously stored in the biometric input database 140.

Figure 7:
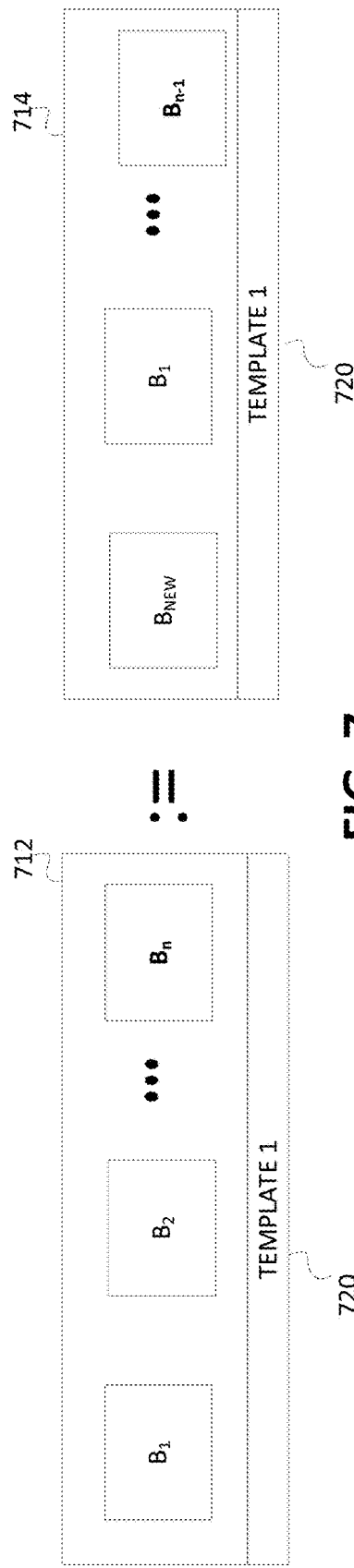
FIG. 7 is a schematic block diagram of updating the biometric input database.

Referring to FIG. 7, a schematic block diagram of updating the biometric input database is shown. The biometric authentication module 124 may update the set of stored biometric inputs 712. For example, the biometric authentication module 124 may store the current biometric input $B_{NEW}$. Further, the biometric authentication module 124 may discard or erase a stored biometric input $B_n$. In various implementations, $B_n$ may be a less or least recent stored entry and/or a less or least similar stored entry to the current biometric input. The updated set of stored biometric inputs may be the set 714. The stored template 720 is the same for the set of stored biometric inputs 712 and for the updated set of stored biometric inputs 714.

The procedures for changing or maintaining the false user counter value may be further clarified by the following example. In previously described pass along hacking procedure example, the electronic device 130 may be passed to multiple unauthorized people with each unauthorized person making multiple attempts to access the device. After the first attempt by a first unauthorized person to access the electronic device 130, the current biometric input may not match any template or any previously stored biometric input. In this case, the current biometric input of the first unauthorized person may be saved and the false user counter value updated to a value closer to the counter threshold value. After the second attempt by the first unauthorized person to access the electronic device 130, the current biometric input may match the biometric input saved after the first attempt (i.e., the previously stored biometric input). In this way, the system may recognize that the same unauthorized person has made two attempts to access the electronic device 130. The current biometric input from the second attempt may be discarded and the counter value may be maintained (i.e., not incremented and not decremented). Thus, the same unauthorized user may only be counted once. In this way, the false user counter value may indicate the number of false users but may not be equivalent to the number of failed attempts to access the electronic device 130. After a first attempt by a second unauthorized user to access the electronic device 130, the current biometric input may not match any template or any previously stored biometric input. In this case, the current biometric input of the second unauthorized person may be saved and the false user counter value may be updated to be closer to the counter threshold value. Subsequently, the authorized user may gain control of the electronic device 130130. As a relatively small number of false users (e.g., as determined by comparing the false user counter value to the counter threshold value) may have attempted to gain access to the electronic device 130, the electronic device 130 may not be a target of a pass along attack and the authorized user may regain access to the electronic device 130 without undue inconvenience from denial of service procedures. The unauthorized user may be prevented from putting the electronic device 130 in a lockdown mode simply by trying to access the electronic device 130 a number of times that would cause a counter that counts the number of failed attempts to exceed a failed attempt counter threshold value.

Figure 8:
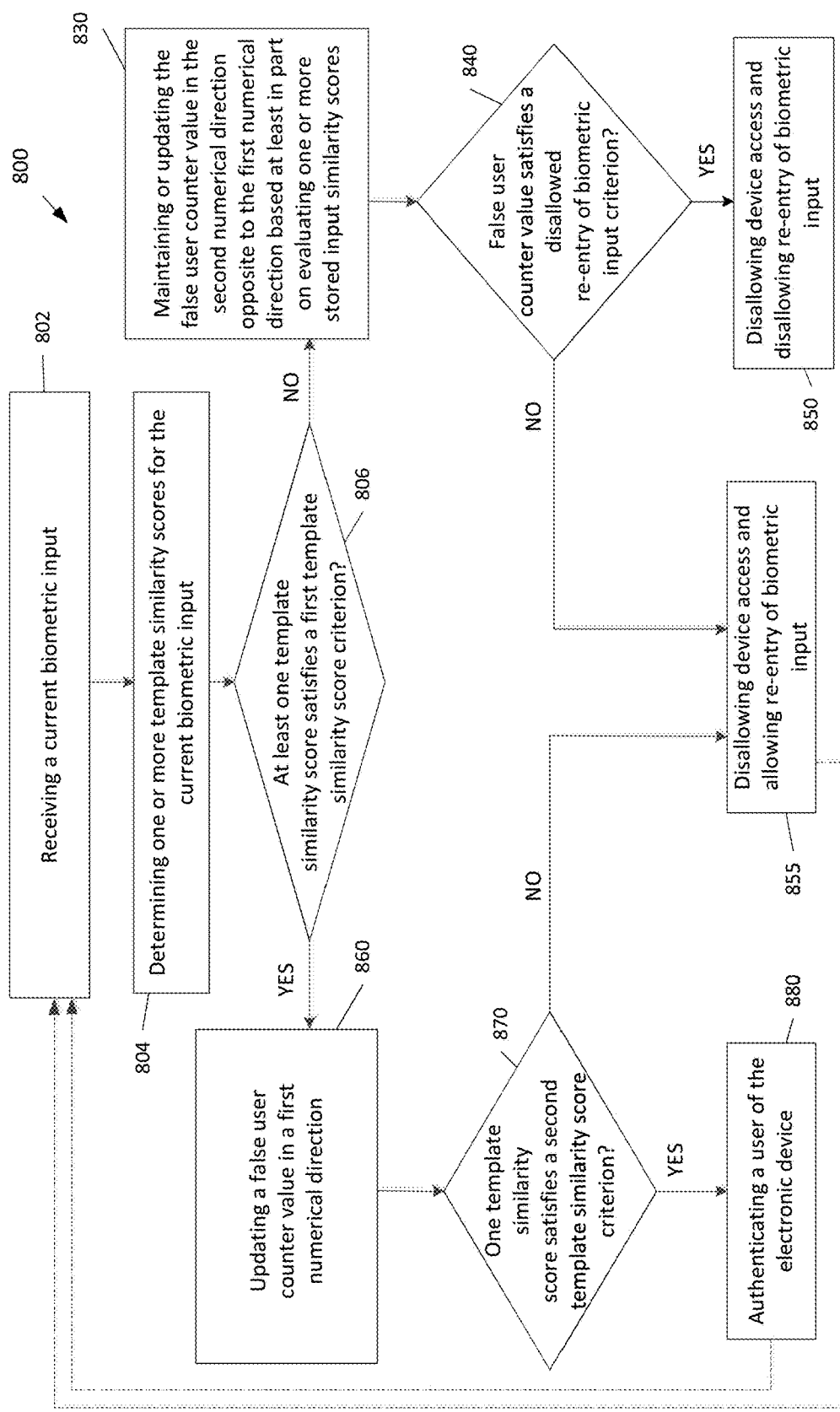
FIG. 8 is a block diagram of another method of controlling access to an electronic device based on biometric input.

Referring to FIG. 8, with further reference to FIGS. 1-7, another method of controlling access to an electronic device 130 based on a biometric input includes the stages shown. The method 800 is, however, an example only and not limiting. The method 800 can be altered, e.g., by having stages added, removed, rearranged, combined, performed concurrently and/or having stages split into multiple stages. In an example, the method 800 supports multiple accounts (i.e., for a mobile device which supports multi-users) such that receiving a biometric input and the similarity scores may be associated with a user account. The stages 802 and 804 are substantially similar to the stages 502 and 504 of the method 500 described above.

At stage 806, the method 800 includes determining if at least one template similarity score satisfies a first template similarity score criterion. For example, the biometric authentication module 124 may determine if the template similarity score satisfies the first template similarity score criterion by comparing the template similarity score to a first template similarity score threshold, $T_{1,T}$ (e.g., a first confidence value threshold). In various implementations, the template similarity score may satisfy the first template similarity score criterion by being one of less than (i.e., <), less than or equal to (i.e., ≤), greater than or equal to (i.e., ≥), or greater than (i.e., >) the first template similarity score threshold. The first template similarity score criterion may correspond to the first confidence value threshold. For example, the template similarity score may be greater than or greater than or equal to $T_{1,T}$ indicating that the current user is likely the authorized user. In an embodiment, $T_{1,T}$ may correspond to a relatively low confidence level (e.g., approximately 50%) that the current user is the authorized user. If the template similarity score satisfies the first template similarity score criterion, then the current user is likely an authorized user of the electronic device 130. However, satisfying the first template similarity score criterion may not authenticate the current user. Depending on the security requirements for the electronic device 130, the confidence level associated with the first template similarity score criterion may be too low to authenticate the user. If the template similarity score does not satisfy the first template similarity score criterion, then the current user is likely an imposter (i.e., a hacker and/or other unauthorized user). For example, the first template similarity score may be less than or less than or equal to $T_{1,T}$ indicating that the current user is likely the unauthorized user. If the template similarity score satisfies the first template similarity score criterion, then the method 800 branches to a stage 860. If the template similarity score does not satisfy the first template similarity score criterion, then the method 800 branches to a stage 830. In this case, the template similarity score equaling and/or exceeding the second template similarity score threshold may authenticate the current user as a particular authorized user.

At the stage 830, the method 800 includes maintaining or updating the false user counter value in the second numerical direction opposite to the first numerical direction based at least in part on evaluating one or more stored input similarity scores. For example, the biometric authentication module 124 may evaluate the stored input similarity score and determine the false user counter value according to the stages 550, 560, 570, 580, and 590 of the method 500. Updating the false user counter value in the second numerical direction opposite to the first numerical direction changes the false user counter value such that the false user counter value moves towards and/or crosses the false user counter threshold. In an implementation, updating the false user counter value in the second numerical direction opposite to the first numerical direction may include increasing the false user counter value (i.e., an addition operation). In another implementation, updating the false user counter value in the second numerical direction opposite to the first numerical direction may include decreasing the false user counter value (i.e., a subtraction operation).

At stage 840, the method 800 includes determining if the false user counter value satisfies a disallowed re-entry of biometric input criterion. For example, the biometric authentication module 124 may compare the value of the false user counter stored in the counter storage module 142, 115 to the counter threshold value, $T_c$ in order to determine if the false user counter value satisfies the disallowed re-entry of biometric input criterion. In an implementation, updating the false user counter value in the second numerical direction opposite to the first numerical direction may include increasing the false user counter value (i.e., an addition operation). For such an implementation, the disallowed re-entry of biometric input criterion may correspond to the false user counter value being equal to and/or being greater than the counter threshold value. In another implementation, updating the false user counter value in the second numerical direction opposite to the first numerical direction may include decreasing the false user counter value (i.e., a subtraction operation). For such an implementation, the disallowed re-entry of biometric input criterion may correspond to the false user counter value being equal to and/or being less than the counter threshold value. At stage 840 the method branches to stage 850 if the false user counter value satisfies the disallowed re-entry of biometric input criterion and to stage 855 if the false user counter value does not satisfy the disallowed re-entry of biometric input criterion.

At the stage 850, the method 800 includes disallowing device access and disallowing re-entry of biometric input. For example, if the false user counter value satisfies the disallowed re-entry of biometric input criterion, then the biometric authentication module 124 may indicate a positive denial of service status to the processor 128. In response, the processor 128 and/or the biometric authentication module 124 may require implementation of one or more denial of service procedures prior to re-entry of any biometric input. In some examples, the denial of service procedures may include notification of a hack attack to a server or service provider, destruction of information on the electronic device 130, self-destruction of the electronic device 130, or any other action that limits access, disallows access, delays access, or communicates a warning in response to a suspected hack attack. Additionally, the denial of service procedures may include requiring that the electronic device 130 be unlocked by a trusted third party. In an embodiment, the biometric authentication module 117 may provide the indication of the device access status to the electronic device 130 via the network interface 112.

At the stage 855, the method 800 includes disallowing device access and allowing re-entry of biometric input. For example, the biometric authentication module 124 may disallow device access by providing an indication to the processor 128 of the negative authentication status. Additionally, the biometric authentication module 124 may provide an indication to the processor 128 of a negative denial of service status. The negative denial of service status indicates that denial of service procedures are not implemented. In response to the negative denial of service status, the processor 128 may enable the biometric input module 122 to accept biometric input without any required time delay or input of secondary authentication information. In this case, although the confidence level that the current user is the authorized user is relatively low, based on $T_{1,T}$, this confidence level is considered high enough to let the current user re-attempt to access the electronic device 130 without the inconvenience of an imposed delay or providing the secondary authentication information. However, the security of the electronic device 130 is maintained as access to the electronic device 130 is denied (i.e., access is limited to re-entry of biometric input).

The method 800 may return to the stage 802 for re-entry of biometric input, as allowed at the stage 855. For example, if the current biometric input is an index finger fingerprint, the biometric authentication module 124 allows a second or subsequent scan of the index finger fingerprint. Further, in this case, the biometric authentication module 124 may allow re-entry of biometric input without imposing a required time interval (e.g., exponential back-off or doubling delay) between input events.

At the stage 860, the method 800 includes updating a false user counter value in a first numerical direction. The stage 860 is substantially similar to the stage 508 of the method 500. At the stage 860, the false user counter value may not satisfy the disallowed re-entry of biometric input criterion.

At stage 870, the method 800 includes determining if one template similarity score satisfies a second template similarity score criterion. For example, the biometric authentication module 124 may determine if one template similarity score of the one or more template similarity scores satisfies the second template similarity score criterion. The biometric authentication module may compare the one or more template similarity scores to a second template similarity score threshold, $T_{2,T}$ (e.g., a second confidence value threshold). The second template similarity score criterion may correspond to the second confidence value threshold. The second template similarity score threshold may correspond to a higher confidence level than the first template similarity score threshold, $T_{1,T}$ that the characteristic features from the current biometric input match the previously stored template. $T_{2,T}$ is set to indicate a relatively high confidence that the current user is the authorized user of the electronic device 130. For example, $T_{2,T}$ may be >90% for low security applications and may be >99% for high security applications. In various implementations, the template similarity score may satisfy the second template similarity score criterion by being one of less than (i.e., <), less than or equal to (i.e., ≤), greater than or equal to (i.e., ≥), or greater than (i.e., >) the second template similarity score threshold. For example, the template similarity score may be greater than or greater than or equal to $T_{2,T}$ indicating authentication of the current user as the authorized user. In this case, the particular template similarity score satisfying the second template similarity score criterion may uniquely identify the current user as a specific authorized user. Each of the one or more template similarity scores may correspond to a respective previously stored biometric template for the particular authorized user. If the template similarity score does not satisfy the second template similarity score criterion, then the current user may likely be the authorized user but is unauthenticated. For example, the template similarity score may be less than or less than or equal to $T_{2,T}$ indicating that the current user is unauthenticated. If the template similarity score satisfies the second template similarity score criterion, the biometric authentication module 124 may indicate a positive authentication status. In this case, the method 800 branches to a stage 880. If the template similarity score does not satisfy the second template similarity score criterion, then the biometric authentication module 124 may indicate a negative authentication status. In this case, the method 800 branches to a stage 855.

In an embodiment, authentication of the current biometric input may be based on multiple biometric inputs. In this case, the biometric authentication module 124 may analyze correlations between biometric inputs. The device access may depend on the correlations. Additionally, the conditional updating of the counter and the device access status may depend on comparisons of multiple similarity scores or a composite similarity score with one or more thresholds. Different biometric input may correspond to different thresholds. For example, in order to gain device access, a similarity score for a retinal scan and a similarity score for a voice recognition would both have to satisfy a threshold requirement. However, the threshold requirement may vary according to biometric technology or the same threshold requirement may apply to one or more biometric technologies.

In an embodiment, the electronic device 130 may have multiple authorized users (e.g., candidates 1 through p as discussed with regard to FIG. 4). In this case the electronic device 130 may determine which candidate is trying to gain access to the device, which candidate is being spoofed, and/or which candidate may be granted access to the device. The counter storage module 142, 115 may include multiple counters, with each counter corresponding to an authorized candidate or authorized user of the device. The biometric authentication module 124 may compare the current biometric input with previously stored biometric information for one or more or all of the authorized candidates. Device access determination may be based on one or more of the multiple counters and may be candidate specific.

At the stage 880, the method 800 includes authenticating a user of the electronic device 130. For example, the biometric authentication module 124 authenticate the user of the electronic device 130 based on one template similarity score of the one or more template similarity scores satisfying the second template similarity score criterion. The biometric authentication module 124 may allow device access for the authenticated user. For example, the biometric authentication module 124 may provide an indication to the processor 128 of a positive authentication status corresponding to an unlocked device.

The stage 880 may also include allowing re-entry of biometric input. The method 800 may return to the stage 802 to re-enter and receive the biometric input. For example, a device access session for the authenticated user may time out or the device may lock, or otherwise restrict access, after a certain period of inactivity. As another example, some operations or applications of the electronic device 130 may require re-entry of biometric input to satisfy particular security requirements.

As a further example, an unauthenticated user may access or otherwise interact with the electronic device 130 during an interruption event. The interruption event corresponds to an interruption in usage by the authenticated user during the device access session. During the interruption event, another user may use the electronic device 130 and/or enter biometric input in order to authenticate. The other user may be an authorized or unauthorized user of the device. The other user may interact with the device that has already been authenticated to and may or may not attempt to intentionally access the device as the currently authenticated user. For example, the authorized user may put the electronic device 130 down and a non-malicious user that shares the electronic device 130 may pick the electronic device 130 up and begin to use the electronic device 130 identified as a different user (i.e., the non-malicious user may begin the biometric input process in order to authenticate as an authorized user). As another example, a malicious user may pick the electronic device 130 up and may attempt to enter biometric input and/or pose as the authenticated and authorized user. The electronic device 130 may detect the interruption event and/or the change of user. For example, information from one or more of the sensors 165 and/or from the processor 128 (e.g., environmental information, position information, motion information, application usage information, input device information (e.g., touch screen, mouse, keyboard, and/or joystick information, etc.), may indicate the interruption of usage, an unusual and/or unexpected usage event, an event and/or movement commonly associated with a change of device users, etc.

In response to detection of the interruption event and/or the change of user, the processor 128 and/or the biometric authentication module 124 may initiate a user verification session. In an embodiment, the verification session may be a lower security authentication process. The lower security authentication process may account for the interruption event. Accounting for the interruption event may include skipping and/or rearranging stages of the method 800 and/or adjusting thresholds and/or other similarity or authentication criteria in response to the detection of the interruption event. The lower security authentication process may include portions of the method 800 and/or may supplement and/or replace portions of the method 800 with other procedures. As an example, the lower security authentication process may compare biometric input and/or other characteristic information (e.g., information from the sensors 165) for the authenticated user during a previous and/or most recent successful authentication session with biometric input and/or other characteristic information for the current user. If there is a sufficient match (e.g., as determined based on similarity scores and/or predetermined match criteria for the biometric input and/or other characteristic information), and the new user is determined to be the same as the authenticated user, the device access session may be extended. If there is an insufficient match, the user verification session may terminate. The electronic device 130 may deny access to the current user and implement procedures as described above for the stage 855 or for the stage 850. In an embodiment, the user verification session may correspond to a higher security authentication process. For example, the higher security authentication process may include all or most of the steps of the method 800. The higher security authentication process may not account for the interruption event and may not skip and/or rearrange stages of the method 800 and/or may not adjust thresholds and/or other similarity or authentication criteria in response to the detection of the interruption event.

OTHER CONSIDERATIONS

Other embodiments are within the scope of the invention. For example, due to the nature of software, functions described above can be implemented using software, hardware, firmware, hardwiring, or combinations of any of these. Features implementing functions may also be physically located at various locations, including being distributed such that portions of functions are implemented at different physical locations.

The terms "machine-readable medium" and "computer-readable medium," as used herein, refer to any medium that participates in providing data that causes a machine to operate in a specific fashion. In an embodiment implemented using the biometric authentication modules 124 and/or 117, various computer-readable media might be involved in providing instructions/code to the module 124 and/or to the processors 128, 118 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the memory 145. Transmission media include, without limitation, coaxial cables, copper wire and fiber optics, including the wires that may couple the various components of the electronic device 130 and/or the server 110. Transmission media can also take the form of waves (including without limitation radio, acoustic and/or light waves, such as those generated during radio-wave and infrared data communications).

Common forms of physical and/or tangible computer program product with a non-transitory processor-readable storage medium include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, DDR, eMMC, any other memory chip or cartridge, or any other medium from which a computer can read instructions and/or code.

Various forms of computer-readable media may be involved in carrying one or more sequences of one or more instructions to the processors 128, 118 and/or the modules 122, 124 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the electronic device 130. These signals, which might be in the form of electromagnetic signals, acoustic signals, optical signals and/or the like, are all examples of carrier waves on which instructions can be encoded, in accordance with various embodiments of the invention.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method of controlling access to an electronic device based on biometric input, comprising:
   receiving a current biometric input using a biometric sensor of the electronic device;
   determining one or more template similarity scores for the current biometric input;
   determining whether at least one template similarity score of the one or more template similarity scores satisfies a template similarity score criterion;
   updating a false user counter value in a first numerical direction and performing an authentication process on the current biometric input responsive to the at least one similarity score of the template similarity scores satisfying the template similarity score criterion, the false user counter value indicating a number of unauthorized users that have attempted to access the electronic device using biometric input;
   responsive to the at least one similarity score of the template similarity scores not satisfying the template similarity score criterion:
      determining one or more stored biometric input similarity scores for the current biometric input;
      determining that the current biometric input has been received from a previous unauthorized user of the electronic device if at least one stored biometric input similarity score of the one or more stored biometric input similarity scores satisfies a stored biometric input similarity score criterion;
      maintaining the false user counter value at a current value responsive to the current biometric input having been received from the previous unauthorized user of the electronic device; and
      responsive to the current biometric input having been received by a new unauthorized user of the user device:
         replacing a previously stored biometric input with the current biometric input, and updating the false user counter value in a second numerical direction opposite to the first numerical direction.

2. The method of claim 1 wherein the template similarity score criterion is a first template similarity score criterion and comprising:
   determining the one or more template similarity scores by determining a similarity between the current biometric input and one or more previously stored biometric templates; and
   if the at least one template similarity score satisfies the first template similarity score criterion, then authenticating a user of the electronic device based on one template similarity score of the one or more template similarity scores satisfying a second template similarity score criterion,
   wherein the first template similarity score criterion corresponds to a first confidence value threshold and the second template similarity score criterion corresponds to a second confidence value threshold, the second confidence value threshold being higher than the first confidence value threshold.

3. The method of claim 1 comprising determining a plurality of template similarity scores for a plurality of authorized users of the electronic device.

4. The method of claim 1 comprising determining the one or more stored biometric input similarity scores for the current biometric input by determining a similarity between the current biometric input and one or more stored biometric inputs.

5. The method of claim 1 comprising:
   determining if the false user counter value satisfies a disallowed re-entry of biometric input criterion based on a false user counter threshold value; and
   if the false user counter value satisfies the disallowed re-entry of biometric input criterion, then disallowing re-entry of biometric input, else allowing the re-entry of biometric input without implementing denial of service procedures.

6. The method of claim 1 wherein the replacing the previously stored biometric input with the current biometric input comprises replacing a previously stored biometric input corresponding to an unauthorized user of the electronic device with the current biometric input.

7. The method of claim 1 further comprising, if the at least one stored biometric input similarity score satisfies the stored biometric input similarity score criterion, then discarding the current biometric input.

8. The method of claim 1 wherein the current biometric input includes at least one of a fingerprint, a retinal scan, a voice recording, or a facial image.

9. An apparatus for determining access to an electronic device based on biometric authentication, comprising:
   a memory; and
   at least one processor operably coupled to the memory and configured to:
      receive a current biometric input using a biometric sensor of the electronic device;
      determine one or more template similarity scores for the current biometric input;
      determining whether at least one template similarity score of the one or more template similarity scores satisfies a template similarity score criterion
      update a false user counter value in a first numerical direction and perform an authentication process on the current biometric input responsive to the at least one similarity score of the template similarity scores satisfies the template similarity score criterion, the false user counter value indicating a number of unauthorized users that have attempted to access the electronic device using biometric input;
      responsive to the at least one similarity score of the template similarity scores not satisfying the template similarity score criterion:
         determine one or more stored biometric input similarity scores for the current biometric input;
         determine that the current biometric input has been received from a previous unauthorized user of the electronic device responsive to at least one stored biometric input similarity score of the one or more stored biometric input similarity scores satisfies a stored biometric input similarity score criterion;
         maintain the false user counter value at a current value responsive to the current biometric input having been received from the previous unauthorized user of the electronic device; and
      responsive to the current biometric input having been received by a new unauthorized user of the user device:
         replace a previously stored biometric input with the current biometric input, and
         update the false user counter value in a second numerical direction opposite to the first numerical direction responsive to the current biometric input having been received from a new unauthorized user of the electronic device.

10. The apparatus of claim 9 wherein the template similarity score criterion is a first template similarity score criterion and the at least one processor is further configured to:
    determine a similarity between the current biometric input and one or more previously stored biometric templates and determine the one or more template similarity scores based on the determined similarity between the current biometric input and the one or more previously stored biometric templates; and
    if the at least one template similarity score satisfies the first template similarity score criterion, then authenticate a user of the electronic device based on one template similarity score of the one or more template similarity scores satisfying a second template similarity score criterion,
    wherein the first template similarity score criterion corresponds to a first confidence value threshold and the second template similarity score criterion corresponds to a second confidence value threshold, the second confidence value threshold being higher than the first confidence value threshold.

11. The apparatus of claim 9 wherein the at least one processor is further configured to determine a plurality of template similarity scores for a plurality of authorized users of the electronic device.

12. The apparatus of claim 9 wherein the at least one processor is further configured to determine a similarity between the current biometric input and one or more stored biometric inputs and determine the one or more stored biometric input similarity scores for the current biometric input based on the determined similarity between the current biometric input and the one or more stored biometric inputs.

13. The apparatus of claim 9 wherein the at least one processor is further configured to:
    determine if the false user counter value satisfies a disallowed re-entry of biometric input criterion based on a false user counter threshold value; and if the false user counter value satisfies the disallowed re-entry of biometric input criterion, then disallow re-entry of biometric input, else allow the re-entry of biometric input without implementing denial of service procedures.

14. The apparatus of claim 9 wherein the at least one processor is further configured to replace a previously stored biometric input corresponding to an unauthorized user of the electronic device with the current biometric input.

15. The apparatus of claim 9 wherein the at least one processor is further configured to discard the current biometric input if the at least one stored biometric input similarity score satisfies the stored biometric input similarity score criterion.

16. The apparatus of claim 9 wherein the current biometric input includes at least one of a fingerprint, a retinal scan, a voice recording, or a facial image.

17. An apparatus for controlling access to an electronic device based on biometric input, comprising:
    means for receiving a current biometric input using a biometric sensor of the electronic device;
    means for determining one or more template similarity scores for the current biometric input;
    means for determining whether at least one template similarity score of the one or more template similarity scores satisfies a template similarity score criterion;
    means for updating a false user counter value in a first numerical direction and performing an authentication process on the current biometric input responsive to the at least one template similarity score of the one or more template similarity scores satisfying a template similarity score criterion, the false user counter value indicating a number of unauthorized users that have attempted to access the electronic device using biometric input;
    means for determining one or more stored biometric input similarity scores for the current biometric input responsive to the at least one template similarity score of the one or more template similarity scores not satisfying the template similarity score criterion;
    means for determining that the current biometric input has been received from a previous unauthorized user of the electronic device responsive to at least one stored biometric input similarity score of the one or more stored biometric input similarity scores satisfies a stored biometric input similarity score criterion;
    means for maintaining the false user counter value at a current value responsive to the current biometric input having been received from the previous unauthorized user of the electronic device;
    means for replacing a previously stored biometric input with the current biometric input and updating the false user counter value in a second numerical direction opposite to the first numerical direction if the at least one stored biometric input similarity score of the one or more stored biometric input similarity scores does not satisfy the stored biometric input similarity score criterion responsive to the current biometric input having been received from a new unauthorized user of the electronic device.

18. The apparatus of claim 17 wherein the template similarity score criterion is a first template similarity score criterion and comprising:
    means for determining the one or more template similarity scores by determining a similarity between the current biometric input and one or more previously stored biometric templates; and
    means for authenticating a user of the electronic device based on one template similarity score of the one or more template similarity scores satisfying a second template similarity score criterion if the at least one template similarity score satisfies the first template similarity score criterion,
    wherein the first template similarity score criterion corresponds to a first confidence value threshold and the second template similarity score criterion corresponds to a second confidence value threshold, the second confidence value threshold being higher than the first confidence value threshold.

19. The apparatus of claim 17 comprising means for determining a plurality of template similarity scores for a plurality of authorized users of the electronic device.

20. The apparatus of claim 17 comprising means for determining the one or more stored biometric input similarity scores for the current biometric input by determining a similarity between the current biometric input and one or more stored biometric inputs.

21. The apparatus of claim 17 comprising:
    means for determining if the false user counter value satisfies a disallowed re-entry of biometric input criterion based on a false user counter threshold value;
    means for disallowing re-entry of biometric input if the false user counter value satisfies the disallowed re-entry of biometric input criterion;
    means for allowing the re-entry of biometric input without implementing denial of service procedures if the false user counter value does not satisfy the disallowed re-entry of biometric input criterion.

22. The apparatus of claim 17 wherein the means for replacing the previously stored biometric input with the current biometric input comprises means for replacing a previously stored biometric input corresponding to an unauthorized user of the electronic device with the current biometric input.

23. The apparatus of claim 17 further comprising means for discarding the current biometric input if the at least one stored biometric input similarity score satisfies the stored biometric input similarity score criterion.

24. The apparatus of claim 17 wherein the current biometric input includes at least one of a fingerprint, a retinal scan, a voice recording, or a facial image.

25. A non-transitory processor-readable storage medium comprising processor-readable instructions configured to cause a processor to control access to an electronic device based on biometric input, comprising:
    code for receiving a current biometric input using a biometric sensor of the electronic device;
    code for determining one or more template similarity scores for the current biometric input;
    code for determining whether at least one template similarity score of the one or more template similarity scores satisfies a template similarity score criterion;
    code for updating a false user counter value in a first numerical direction and code for performing an authentication process on the current biometric input responsive to the at least one template similarity score of the one or more template similarity scores satisfying a template similarity score criterion, the false user counter value indicating a number of unauthorized users that have attempted to access the electronic device using biometric input;
    code for determining one or more stored biometric input similarity scores for the current biometric input responsive to the at least one template similarity score of the one or more template similarity scores not satisfying the template similarity score criterion;

code for determining that the current biometric input has been received from a previous unauthorized user of the electronic device if at least one stored biometric input similarity score of the one or more stored biometric input similarity scores satisfies a stored biometric input similarity score criterion;

code for maintaining the false user counter value at a current value responsive to the current biometric input having been received from the previous unauthorized user of the electronic device; and code for replacing a previously stored biometric input with the current biometric input and code for updating the false user counter value in a second numerical direction opposite to the first numerical direction, if the at least one stored biometric input similarity score of the one or more stored biometric input similarity scores does not satisfy the stored biometric input similarity score criterion responsive to the current biometric input having been received from a new unauthorized user of the electronic device.

26. The storage medium of claim 25 wherein the template similarity score criterion is a first template similarity score criterion and wherein the processor-readable instructions are further configured to:

determine the one or more template similarity scores by determining a similarity between the current biometric input and one or more previously stored biometric templates; and authenticate a user of the electronic device based on one template similarity score of the one or more template similarity scores satisfying a second template similarity score criterion if the at least one template similarity score satisfies the first template similarity score criterion, wherein the first template similarity score criterion corresponds to a first confidence value threshold and the second template similarity score criterion corresponds to a second confidence value threshold, the second confidence value threshold being higher than the first confidence value threshold.

27. The storage medium of claim 25 wherein the processor-readable instructions are further configured to determine a plurality of template similarity scores for a plurality of authorized users of the electronic device.

28. The storage medium of claim 25 wherein the processor-readable instructions are further configured to determine a similarity between the current biometric input and one or more stored biometric inputs and determine the one or more stored biometric input similarity scores for the current biometric input based on the determined similarity between the current biometric input and the one or more stored biometric inputs.

29. The storage medium of claim 25 wherein the processor-readable instructions are further configured to:

determine if the false user counter value satisfies a disallowed re-entry of biometric input criterion based on a false user counter threshold value; and if the false user counter value satisfies the disallowed re-entry of biometric input criterion, then disallow re-entry of biometric input, else allow the re-entry of biometric input without implementing denial of service procedures.

30. The storage medium of claim 25 wherein the wherein the processor-readable instructions are further configured to replace a previously stored biometric input corresponding to an unauthorized user of the electronic device with the current biometric input.

31. The storage medium of claim 25 wherein the processor-readable instructions are further configured to discard the current biometric input if the at least one stored biometric input similarity score satisfies the stored biometric input similarity score criterion.

32. The storage medium of claim 25 wherein the current biometric input includes at least one of a fingerprint, a retinal scan, a voice recording, or a facial image.

* * * * *